(12) United States Patent
Abe

(10) Patent No.: US 8,407,047 B2
(45) Date of Patent: Mar. 26, 2013

(54) GUIDANCE INFORMATION DISPLAY DEVICE, GUIDANCE INFORMATION DISPLAY METHOD AND RECORDING MEDIUM

(75) Inventor: Kenji Abe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 606 days.

(21) Appl. No.: 12/385,158

(22) Filed: Mar. 31, 2009

(65) Prior Publication Data

US 2009/0326943 A1 Dec. 31, 2009

(30) Foreign Application Priority Data

Jun. 25, 2008 (JP) ................................. 2008-166473

(51) Int. Cl.
*G10L 15/00* (2006.01)

(52) U.S. Cl. ........ 704/231; 704/235; 704/246; 704/251; 704/254; 704/9

(58) Field of Classification Search .................. 704/246, 704/231
See application file for complete search history.

(56) References Cited

U.S. PATENT DOCUMENTS

| | | | | |
|---|---|---|---|---|
| 5,548,647 A * | 8/1996 | Naik et al. | ..................... | 704/200 |
| 5,559,925 A * | 9/1996 | Austin | ........................... | 704/231 |
| 6,006,183 A * | 12/1999 | Lai et al. | ....................... | 704/235 |
| 6,006,222 A * | 12/1999 | Culliss | .................................. | 1/1 |
| 6,760,701 B2 * | 7/2004 | Sharma et al. | ................. | 704/249 |
| 7,035,799 B1 * | 4/2006 | Hauenstein | .................... | 704/246 |
| 7,161,468 B2 * | 1/2007 | Hwang et al. | ................. | 340/5.82 |
| 7,366,666 B2 * | 4/2008 | Balchandran et al. | ........ | 704/236 |
| 7,366,668 B1 * | 4/2008 | Franz et al. | .................... | 704/252 |
| 7,409,343 B2 * | 8/2008 | Charlet | ......................... | 704/246 |
| 7,444,324 B2 * | 10/2008 | Ortega et al. | ......................... | 1/1 |
| 7,542,971 B2 * | 6/2009 | Thione et al. | ......................... | 1/1 |
| 7,865,362 B2 * | 1/2011 | Braho et al. | ..................... | 704/251 |
| 7,925,657 B1 * | 4/2011 | Pfleger et al. | ................. | 707/751 |
| 7,996,218 B2 * | 8/2011 | Kim et al. | ..................... | 704/236 |

(Continued)

FOREIGN PATENT DOCUMENTS

| | | |
|---|---|---|
| JP | 5-113863 | 5/1993 |
| JP | 9-167071 | 6/1997 |

(Continued)

OTHER PUBLICATIONS

Bernhard Rueber, "Obtaining Confidence Measures from Sentence Probabilities", Eurospeech '97, 5th European Conference on Speech Communication and Technology, Sep. 1997, Abstract only.

*Primary Examiner* — Pierre-Louis Desir
*Assistant Examiner* — Fariba Sirjani
(74) *Attorney, Agent, or Firm* — Staas & Halsey LLP

(57) ABSTRACT

A guidance information display device includes: a voice input unit; a display unit for displaying guidance information; an operation unit for accepting an operation; and a processor capable of executing the following processes of: a voice recognition process operation of performing voice recognition based on inputted voice; a calculation operation of calculating an evaluation value for a recognition result of voice recognition by the voice recognition process operation; a display operation of reading out guidance information corresponding to the recognition result from a storage unit, which stores the guidance information, and displaying the guidance information at a display unit; and a decision operation of deciding a display mode of the guidance information at the display unit based on a variable value, which varies with an operation from the operation unit for the guidance information displayed by the display operation, and the evaluation value calculated by the calculation operation.

20 Claims, 31 Drawing Sheets

156 THRESHOLD STORAGE UNIT

| DATE AND TIME | KEYWORD | GUIDANCE INFORMATION | EVALUATION VALUE | INITIAL THRESHOLD | FINAL THRESHOLD | DISPLAY MODE |
|---|---|---|---|---|---|---|
| ... | ... | ... | ... | ... | ... | ... |
| 2008/06/02/10:20:35 | NEW PRODUCT | ... | 70 | 45 | 50 | LARGE |
| 2008/06/02/11:21:35 | NEW PRODUCT | ... | 88 | 50 | 57 | LARGE |
| 2008/06/02/11:22:35 | NEW PRODUCT | ... | 90 | 57 | 60 | LARGE |
| 2008/06/02/11:23:35 | NEW PRODUCT | ... | 85 | 57 | 55 | LARGE |
| ⋮ | ⋮ | ⋮ | ⋮ | ⋮ | ⋮ | ⋮ |
| 2008/06/02/11:22:35 | INSTALL | ... | 75 | 69 | 72 | MEDIUM |
| 2008/06/02/11:55:35 | INSTALL | ... | 60 | 72 | 74 | SMALL |
| 2008/06/02/11:56:35 | INSTALL | ... | 58 | 74 | 76 | SMALL |
| 2008/06/02/11:57:35 | INSTALL | ... | 50 | 76 | 78 | SMALL |
| 2008/06/02/11:58:35 | INSTALL | ... | 55 | 81 | 83 | SMALL |

U.S. PATENT DOCUMENTS

| | | | |
|---|---|---|---|
| 8,234,114 B2 * | 7/2012 | Chang et al. | 704/252 |
| 2002/0065710 A1 * | 5/2002 | Saito | 705/10 |
| 2003/0009333 A1 * | 1/2003 | Sharma et al. | 704/246 |
| 2005/0033803 A1 * | 2/2005 | Vleet et al. | 709/203 |
| 2006/0116876 A1 * | 6/2006 | Marcus | 704/231 |
| 2006/0178882 A1 * | 8/2006 | Braho et al. | 704/240 |
| 2007/0150279 A1 * | 6/2007 | Gandhi et al. | 704/258 |
| 2007/0198264 A1 * | 8/2007 | Chang | 704/250 |
| 2007/0241861 A1 * | 10/2007 | Venkatanna et al. | 340/5.52 |
| 2008/0147390 A1 * | 6/2008 | Balchandran et al. | 704/231 |
| 2009/0216757 A1 * | 8/2009 | Sen et al. | 707/5 |
| 2009/0259466 A1 * | 10/2009 | Stubley et al. | 704/240 |
| 2010/0010805 A1 * | 1/2010 | Balchandran et al. | 704/9 |
| 2011/0010170 A1 * | 1/2011 | Burns et al. | 704/231 |
| 2011/0093269 A1 * | 4/2011 | Braho et al. | 704/251 |
| 2011/0161084 A1 * | 6/2011 | Lin et al. | 704/252 |
| 2011/0231183 A1 * | 9/2011 | Yamamoto et al. | 704/9 |
| 2012/0036159 A1 * | 2/2012 | Katsurada et al. | 707/780 |
| 2012/0046951 A1 * | 2/2012 | Michelini et al. | 704/270.1 |
| 2012/0158402 A1 * | 6/2012 | Aoki et al. | 704/211 |

FOREIGN PATENT DOCUMENTS

| | | |
|---|---|---|
| JP | 2005-339253 | 12/2005 |
| JP | 2006-107108 | 4/2006 |
| JP | 2007-108407 | 4/2007 |
| JP | 2007-200104 | 8/2007 |

* cited by examiner

FIG. 3

153 RECOGNITION RESULT FILE

| RECOGNITION RESULT | EVALUATION VALUE | RECOGNITION DATE TIME | RECOGNITION RESULT KEYWORD |
|---|---|---|---|
| I WANT TO KNOW NEW PRODUCT | 85 | 2008/06/02/11:20:30 | NEW PRODUCT |
| HOW TO INSTALL ... | 78 | 2008/06/02/11:23:30 | INSTALL |
| I CANNOT TURN ON POWER | 88 | 2008/06/02/11:28:30 | POWER |
| ... | ... | ... | ... |

FIG. 4
154 GUIDANCE INFORMATION DB

| RECOGNITION RESULT KEYWORD | GUIDANCE INFORMATION | EDIT INFORMATION |
|---|---|---|
| NEW PRODUCT | LATEST MODEL INFORMATION<br>MODEL NUMBER: AAA-A<br>PRICE: XXX YEN<br>RELEASE DATE: XXXX/XX/XX<br>[LINK HTTP://www.xxx.xxx..]<br>TO DETAILS OF SPECIFICATIONS<br>FEATURES:....<br>OPTIONS:....<br>... | THERE ARE MANY INQUIRIES CONCERNING COLOR VARIATION |
| INSTALL | FAQ No.5<br>1. CLICK DOWNLOADED .... EXE"<br>2. PUSH BUTTON "YES" ACCORDING TO INSTRUCTION ON DISPLAY<br>3. PUSH PROPERTY BUTTON<br>4. ...<br>5. ...<br>6. [LINK HTTP://www.xxx.xxx..] TO RELATED ITEM | |
| ... | ... | ... |

F I G. 6

155 OPERATION HISTORY FILE

| KEYWORD | THRESHOLD | DATE AND TIME | OPERATION ITEM | POINT |
|---|---|---|---|---|
| NEW PRODUCT | 50 | 2008/06/02/11:20:35 | SCROLL | +1 |
|  |  | 2008/06/02/11:20:40 | HYPERLINK | +1 |
|  |  | 2008/06/02/11:20:45 | EDIT INFORMATION REGISTRATION | +1 |
|  |  | 2008/06/02/11:20:53 | GO TO TASKBAR | +2 |
|  |  | 2008/06/02/11:21:05 | REDISPLAY FROM TASKBAR | −1 |
|  |  | 2008/06/02/11:21:35 | DELETE | +3 |
|  | 57 |  |  |  |

F I G. 7

157 POINT TABLE

| OPERATION ITEM | POINT |
|---|---|
| SCROLL | +1 |
| HYPERLINK | +1 |
| EDIT INFORMATION REGISTRATION | +1 |
| GO TO TASKBAR | +2 |
| REDISPLAY FROM TASKBAR | −1 |
| DELETE | +3 |
| DELETE WITHIN GIVEN TIME PERIOD | +5 |
| ⋮ | ⋮ |

F I G. 8

156 THRESHOLD STORAGE UNIT

| DATE AND TIME | KEYWORD | GUIDANCE INFORMATION | EVALUATION VALUE | INITIAL THRESHOLD | FINAL THRESHOLD | DISPLAY MODE |
|---|---|---|---|---|---|---|
| ... | ... | ... | ... | ... | ... | ... |
| 2008/06/02/10:20:35 | NEW PRODUCT | ... | 70 | 45 | 50 | LARGE |
| 2008/06/02/11:21:35 | NEW PRODUCT | ... | 88 | 50 | 57 | LARGE |
| 2008/06/02/11:22:35 | INSTALL | ... | 70 | 69 | 72 | MEDIUM |
| 2008/06/02/11:55:35 | INSTALL | ... | 60 | 72 | 74 | SMALL |

FIG. 9

158 DISPLAY MODE FILE

| DISPLAY MODE | WINDOW SIZE | FONT SIZE |
|---|---|---|
| LARGE | (300, 300) | 30 |
| MEDIUM | (200, 200) | 20 |
| SMALL | (100, 100) | 10 |

FIG. 12

156 THRESHOLD STORAGE UNIT

| DATE AND TIME | KEYWORD | GUIDANCE INFORMATION | EVALUATION VALUE | INITIAL THRESHOLD | FINAL THRESHOLD | DISPLAY MODE |
|---|---|---|---|---|---|---|
| ... | ... | ... | ... | ... | ... | ... |
| 2008/06/02/10:20:35 | NEW PRODUCT | ... | 70 | 45 | 50 | LARGE |
| 2008/06/02/11:21:35 | NEW PRODUCT | ... | 88 | 50 | 57 | LARGE |
| 2008/06/02/11:22:35 | NEW PRODUCT | ... | 90 | 57 | 60 | LARGE |
| 2008/06/02/11:23:35 | NEW PRODUCT | ... | 85 | 57 | 55 | LARGE |
| ... | ... | ... | ... | ... | ... | ... |
| 2008/06/02/11:22:35 | INSTALL | ... | 75 | 69 | 72 | MEDIUM |
| 2008/06/02/11:55:35 | INSTALL | ... | 60 | 72 | 74 | SMALL |
| 2008/06/02/11:56:35 | INSTALL | ... | 58 | 74 | 76 | SMALL |
| 2008/06/02/11:57:35 | INSTALL | ... | 50 | 76 | 78 | SMALL |
| 2008/06/02/11:58:35 | INSTALL | ... | 55 | 81 | 83 | SMALL |

F I G. 1 4

157 POINT TABLE

| OPERATION ITEM | POINT |
|---|---|
| SCROLL | +1 |
| HYPERLINK | +1 |
| EDIT INFORMATION REGISTRATION | +1 |
| GO TO TASKBAR | +2 |
| REDISPLAY FROM TASKBAR | −1 |
| DELETE | +3 |
| DELETE WITHIN GIVEN TIME PERIOD | +5 |
| NON-OPERATION FOR GIVEN TIME PERIOD | +2 |
| PROGRAM TERMINATION | −1 |
| ⋮ | ⋮ |

F I G. 1 5

155 OPERATION HISTORY FILE

| KEYWORD | THRESHOLD | DATE AND TIME | OPERATION ITEM | POINT |
|---|---|---|---|---|
| NEW PRODUCT | 50 | 2008/06/02/11:20:00 | SCROLL | +1 |
|  |  | 2008/06/02/11:25:00 | NON-OPERATION FOR GIVEN TIME PERIOD | +2 |
| ... | 53 | ... | ... | ... |
| INSTALL | 50 | 2008/06/02/11:30:00 | SCROLL | +1 |
|  | 50 | 2008/06/02/11:32:00 | PROGRAM TERMINATION | −1 |

FIG. 17

155 OPERATION HISTORY FILE

| KEYWORD | GUIDANCE INFORMATION | INITIAL THRESHOLD | INTERMEDIATE THRESHOLD | FINAL THRESHOLD | DATE AND TIME | OPERATION ITEM | POINT |
|---|---|---|---|---|---|---|---|
| NEW PRODUCT | ... | 50 | 51 | | 06/02/11:20:35 | SCROLL | +1 |
| | | | 52 | | 06/02/11:20:40 | HYPERLINK | +1 |
| | | | 53 | | 06/02/11:20:45 | EDIT | +1 |
| | | | 55 | | 06/02/11:20:53 | INFORMATION REGISTRATION GO TO TASKBAR | +2 |
| | | | 54 | | 06/02/11:21:05 | REDISPLAY FROM TASKBAR | -1 |
| | | | | 57 | 06/02/11:21:35 | DELETE | +3 |

FIG. 18

156 THRESHOLD STORAGE UNIT

| DATE AND TIME | KEYWORD | GUIDANCE INFORMATION | EVALUATION VALUE | INITIAL THRESHOLD | INTERMEDIATE THRESHOLD | FINAL THRESHOLD | DISPLAY MODE |
|---|---|---|---|---|---|---|---|
| ... | ... | ... | ... | ... | ... | ... | ... |
| 06/02/09:23:35 | NEW PRODUCT | ... | 70 | 45 | − | 50 | LARGE |
| 06/02/11:21:35 | NEW PRODUCT | ... | 61 | 50 | 55 | − | MEDIUM |

FIG. 20

156 THRESHOLD STORAGE UNIT

| DATE AND TIME | KEYWORD | GUIDANCE INFORMATION | EVALUATION VALUE | INITIAL THRESHOLD | FINAL THRESHOLD | DISPLAY MODE |
|---|---|---|---|---|---|---|
| ... | ... | ... | ... | ... | ... | ... |
| 06/02/09:23:35 | NEW PRODUCT | ... | 70 | 45 | 50 | LARGE |
| ... | ... | ... | ... | ... | ... | ... |
| 06/10/09:21:35 | NEW PRODUCT | ... | 59 | 45 | 50 | LARGE |

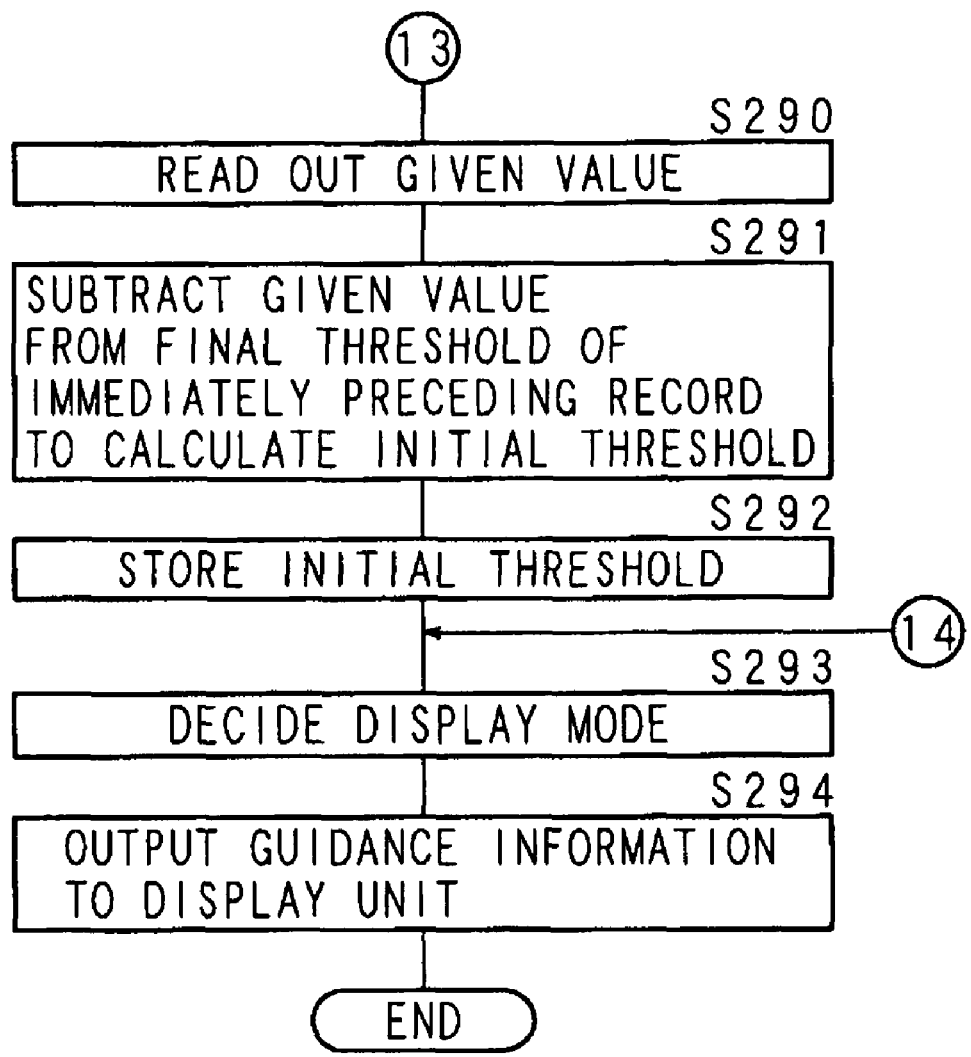

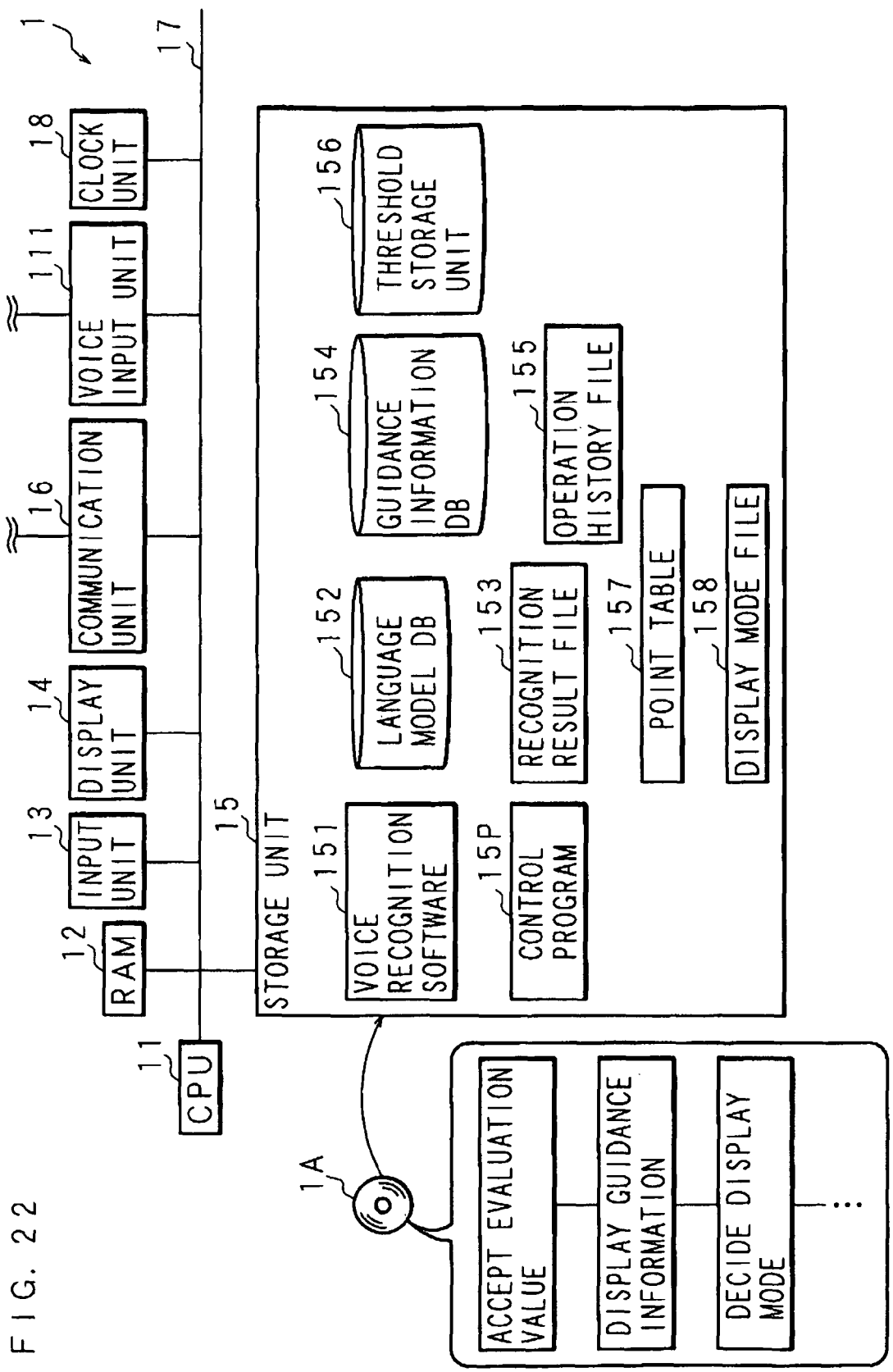

GUIDANCE INFORMATION DISPLAY DEVICE, GUIDANCE INFORMATION DISPLAY METHOD AND RECORDING MEDIUM

CROSS-REFERENCE TO RELATED APPLICATIONS

This application is based upon and claims the benefit of priority of the prior Japanese Patent Application No. 2008-166473, filed on Jun. 25, 2008, the entire contents of which are incorporated herein by reference.

FIELD

The present embodiments discussed herein relate to a guidance information display device and a guidance information display method for displaying guidance information at a display unit, and a recording medium stored a program for causing a computer to function as a guidance information display device.

BACKGROUND

A service to provide an answer to a question concerning a product or to provide guidance concerning a new product by telephone is in widespread use. The operator responds using a computer so as to provide prompt and accurate guidance to the user. Voice recognition software is installed on such a computer, and guidance information based on a recognition result of recognition by the voice recognition software is displayed at a display unit. Hence, the operator can provide accurate guidance while referring to guidance information corresponding to a language spoken by the user. Conventionally, for displaying such guidance information, a higher priority is given to a recognition result having a higher degree of accuracy, so as to enhance the visibility (see Japanese Patent Application Laid-Open No. 2007-108407 or Japanese Patent Application Laid-Open No. 2006-107108, for example).

However, a conventional display device only changes a display mode on the basis of the degree of accuracy of the recognition result and has a problem that guidance information still may not be presented efficiently to the operator.

SUMMARY

According to an aspect of the embodiment, a guidance information display device includes:
a voice input unit for inputting voice;
a display unit for displaying guidance information;
an operation unit for accepting an operation; and
a processor capable of executing processes.
The processor capable of executing the following processes of
a voice recognition process operation of performing voice recognition based on inputted voice in the voice input unit;
a calculation operation of calculating an evaluation value for a recognition result of voice recognition by the voice recognition process operation;
a display operation of reading out guidance information corresponding to the recognition result from a storage unit, which stores the guidance information, and displaying the guidance information at a display unit; and
a decision operation of deciding a display mode of the guidance information at the display unit based on a variable value, which varies with an operation from the operation unit for the guidance information displayed by the display operation, and the evaluation value calculated by the calculation operation.

The object and advantages of the invention will be realized and attained by the elements and combinations particularly pointed out in the claims. It is to be understood that both the foregoing general description and the following detailed description are exemplary and explanatory and are not restrictive of the embodiment, as claimed.

BRIEF DESCRIPTION OF DRAWINGS

FIG. 3 is an explanatory drawing illustrating a record layout of a recognition result file;
FIG. 4 is an explanatory drawing illustrating a record layout of a guidance information DB;
FIG. 6 is an explanatory drawing illustrating a record layout of an operation history file;
FIG. 7 is an explanatory drawing illustrating a record layout of a point table;
FIG. 8 is an explanatory drawing illustrating a record layout of a threshold storage unit;
FIG. 9 is an explanatory drawing illustrating a record layout of a display mode file;
FIG. 12 is an explanatory drawing illustrating a record layout of a threshold storage unit according to Embodiment 2;
FIG. 14 is an explanatory drawing illustrating a record layout of a point table according to Embodiment 3;
FIG. 15 is an explanatory drawing illustrating a record layout of an operation history file according to Embodiment 3;
FIG. 17 is an explanatory drawing illustrating a record layout of an operation history file according to Embodiment 4;
FIG. 18 is an explanatory drawing illustrating a record layout of a threshold storage unit according to Embodiment 4;
FIG. 20 is an explanatory drawing illustrating a record layout of a threshold storage unit according to Embodiment 5;
FIGS. 21A and 21B are operation charts illustrating a procedure of an initial threshold changing process;
and
FIG. 22 is a block diagram illustrating a personal computer according to Embodiment 6.

DESCRIPTION OF EMBODIMENTS

Embodiment 1

It is an object of the embodiment to provide a guidance information display device and the like which can display guidance information in the most suitable mode for use environment and experience of each operator and for the voice recognition accuracy.

Figure 1:
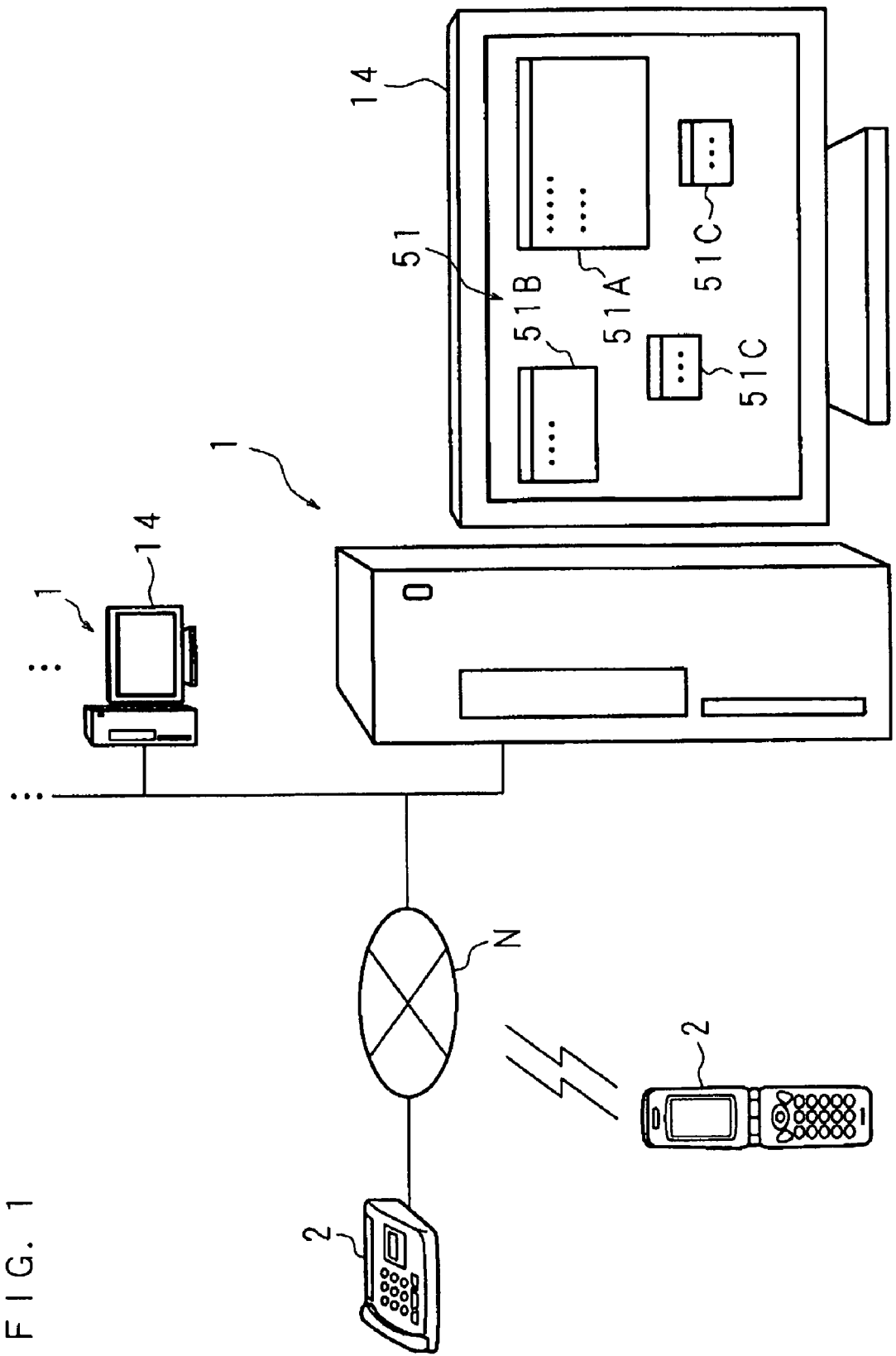
FIG. 1 is an explanatory drawing illustrating an outline of a voice guidance system.

FIG. 1 is an explanatory drawing illustrating an outline of a voice guidance system. The voice guidance system includes guidance information display devices 1, 1, . . . , communication devices 2, 2, . . . , and a communication network N. Used as a guidance information display device 1 is, for example, a personal computer, a telephone set provided with a display unit, a PDA (Personal Digital Assistant) or a mobile telephone or the like. The following description will explain an example wherein a personal computer 1 provided with a display unit 14, such as a liquid crystal display, is applied to a guidance information display device 1.

The personal computer 1 is connected with the communication devices 2, 2, . . . , such as a telephone set, a mobile telephone or a personal computer provided with a communication function, via the communication network N including the Internet, a mobile telephone network or a public telephone network. The following explanation is based on the assumption that a communication device 2 is a mobile telephone 2. The user of the mobile telephone 2 starts a call to the operator who uses the personal computer 1 and then addresses a question item. Addressed data is fetched into the personal computer 1 via the communication network N.

The personal computer 1 performs a voice recognition process and provides a pop-up display of guidance information 51, which corresponds to a recognition result, at the display unit 14. The operator refers to the displayed guidance information 51 so as to make it possible to provide an appropriate answer to the user of the mobile telephone 2. The personal computer 1 decides the display mode of the guidance information 51 on the basis of an evaluation value indicative of the accuracy of a recognition result and a variable value (which will be hereinafter referred to as a threshold) which varies with an operation for the guidance information 51. The personal computer 1 displays the guidance information 51 according to the decided display mode.

In the example illustrated in FIG. 1, guidance information 51A is displayed to have a size larger than a normal size, which acts as the reference, of guidance information 51B, and guidance information 51C. 51C are displayed to have a size smaller than that of the guidance information 5B. When an operation for guidance information 51 is performed, the personal computer 1 raises a threshold and provides a small display as the guidance information 51C, 51C. The personal computer 1 also decreases a threshold under certain conditions and provides a large display as the guidance information 51A on the contrary. It is to be noted that the present embodiment is not limited to the description of the present embodiment explaining an example wherein a display larger than the window of the guidance information 51B having a normal size is provided in order to highlight information and a smaller display is provided in order not to highlight information. For example, a character size may be made large for display in order to highlight information and a character size may be made small in order not to highlight information. In addition, characters may be displayed in a striking color such as red or a fluorescent color in order to highlight information and characters may be displayed in a quiet color such as gray, in comparison with normal black, in order not to highlight information.

Figure 2:
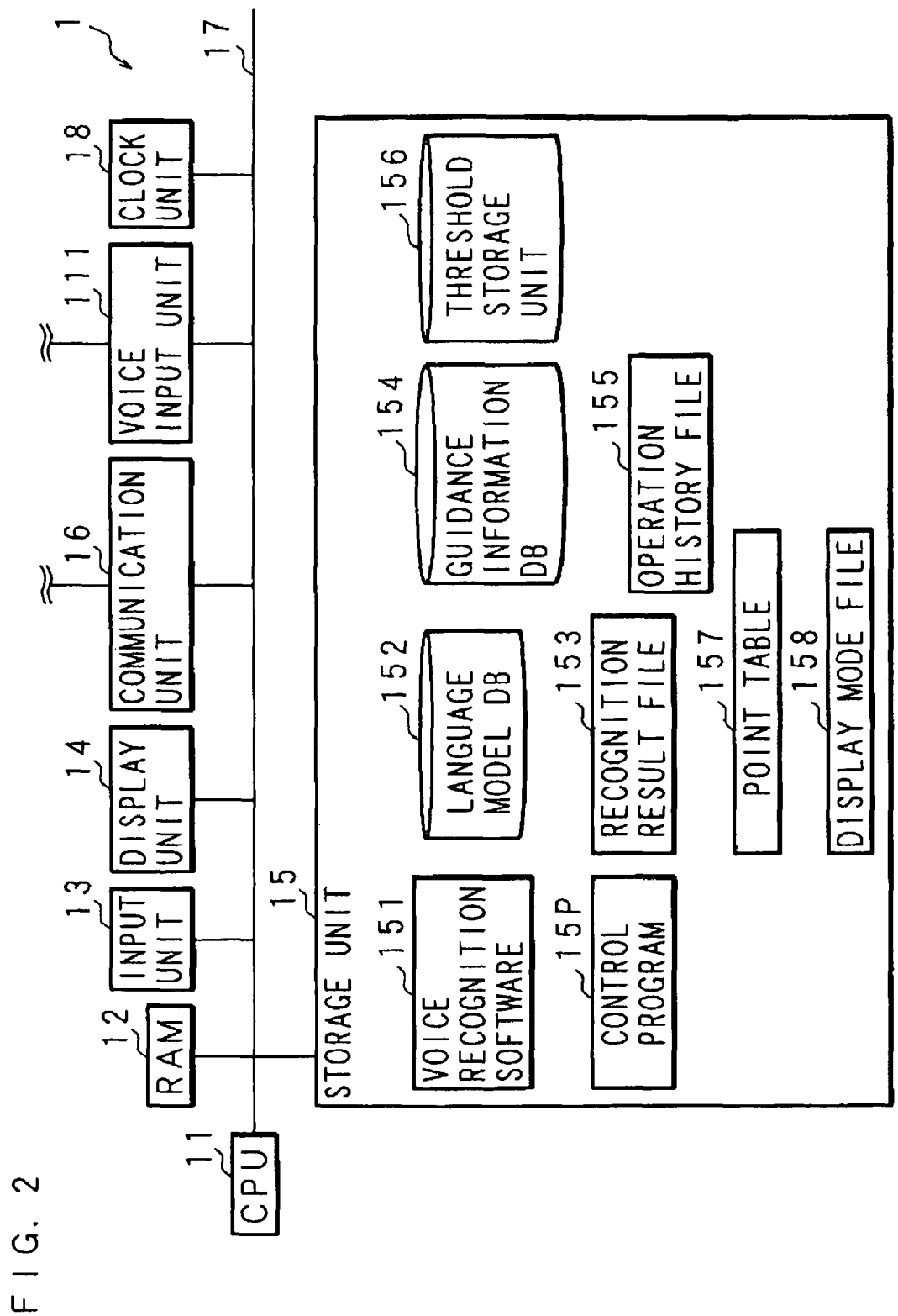
FIG. 2 is a block diagram illustrating a hardware group of a personal computer.

FIG. 2 is a block diagram illustrating a hardware group of the personal computer 1. The personal computer 1 includes a CPU (Central Processing Unit) 11, which functions as a control unit, a RAM (Random Access Memory) 12, an operation unit (which will be hereinafter referred to as an input unit) 13, a display unit 14, a communication unit 16, a voice input unit 111, a clock unit 18, a storage unit 15 and the like. The CPU 11 is connected with respective hardware parts of the personal computer 1 via a bus 17. The CPU 11 controls the respective hardware parts. The CPU 11 executes a variety of software functions according to a control program 15P, voice recognition software 151 and the like stored in the storage unit 15. The storage unit 15, such as a hard disk or a large capacity memory, stores an OS (Operating System), such as the Windows (registered trademark), and a language model database (DB in the following description) 152. In addition, the storage unit 15 stores a recognition result file 153, a guidance information DB 154, an operation history file 155, a threshold storage unit 156, a point table 157, a display mode file 158 and the like.

The display unit 14 is of, for example, a liquid crystal display or an organic EL (Electro-Luminescence) display, and guidance information 51 is displayed at the display unit 14 as illustrated in FIG. 1. The input unit 13 is composed of a keyboard and a mouse or the like, and operation information inputted for the guidance information 51 from the input unit 13 is outputted to the CPU 11. Moreover, the input unit 13 may be constituted of a touch panel accumulated on the display unit 14. The following explanation is based on the assumption that the input unit 13 is composed of a keyboard and a mouse. The communication unit 16 is a LAN (Local Area Network) card or the like, and transmits and receives information to and from another personal computer 1, a Web server computer, which is not illustrated, or the like, using a protocol such as an HTTP (Hyper Text Transfer Protocol). The voice input unit 111 includes for example, a voice input terminal, and fetches in a voice signal transmitted from the mobile telephone 2. The voice signal fetched in from the voice input unit 111 is digitized by an A/D converter which is not illustrated. Digitized voice data is outputted to the CPU 11 and voice processing, which will be described later, is performed. Voice to be fetched into the voice input unit 111 may be voice data using a VoIP (Voice over Internet Protocol).

The clock unit 18 outputs date time information to the CPU 11. The storage unit 15 stores the guidance information DB 154 and the like. The CPU 11 executes processing such as storage or retrieval of information to be used, by dialog using SQL (Structured Query Language) or the like in a schema associated with a key of a field such as the guidance information DB 154. The present embodiment is not limited to the description of the present embodiment explaining an example wherein the language model DB 152, the guidance information DB 154 and the like to be used for a voice recognition process are stored in the storage unit 15 in the personal computer 1. For example, the language model DB 152, the guidance information DB 154 and the like may be stored in a database server (not illustrated) connected with a LAN which is constructed from personal computers 1, 1, . . . . In this case, the CPU 11 accesses the database server and retrieves information to be used, when needed.

Next, a voice recognition process will be explained. The voice recognition process is executed by the voice recognition software 151 which functions as a voice recognition processor and a calculator. The CPU 11 activates the voice recognition software 151, performs a voice recognition process for voice data inputted from the voice input unit 111, and outputs a recognition result and an evaluation value indicative of the accuracy of the aforementioned recognition result. An evaluation value indicative of the accuracy of the recognition result corresponds to, for example, a language likelihood, an acoustic likelihood, a confidence measure (see B. Rueber, "Obtaining confidence measures from sentence probabilities," in Proc. 5th Eur. Conf Speech Communication Technology 1997, Rhodes, Greece, September 1997, pp. 739-742), significance and the like of a recognition result as described in Japanese Patent Application Laid-Open No. 2007-108407. The following description will explain an example wherein the product of a language likelihood and an acoustic likelihood is used as the evaluation value, for ease of explanation.

The language model DB 152 stores a large number of language models to be used for a voice recognition process, and Ngram (e.g., N=3) based on the statistic of word concatenation is used in the present embodiment. The CPU 11 refers to an acoustic model constituted of a phoneme-environment-dependent phoneme HMM (Hidden Markov Model) and a language model stored in the language model DB 152 and converts input voice into a string of words having the highest likelihood by a heretofore known voice recognition process. Here, the likelihood of a string of words is calculated as the product (or the sum in a log domain) of a matching likelihood (acoustic likelihood) between a string of words and input voice and a likelihood (language likelihood) of a string of words based on a language model. The acoustic likelihood is calculated as a likelihood obtained when a feature vector of voice data is inputted for an acoustic model in which a phoneme-environment-dependent phoneme HMM is arranged according to a phonetic symbol of a string of words. Moreover, used as the language likelihood is a likelihood obtained by calculating a likelihood of a string of words by the respective language models and choosing a higher likelihood.

The CPU 11 recognizes the product of the acoustic likelihood and the language likelihood as an evaluation value indicative of the accuracy, and stores a string of words having the largest evaluation value as a recognition result of input voice in the recognition result file 153. FIG. 3 is an explanatory drawing illustrating a record layout of a recognition result file 153. The recognition result file 153 includes a recognition result field, an evaluation value field, a recognition date time field and a recognition result keyword field. In the recognition result file 153, an evaluation value or the like is stored in accordance with a recognition result of inputted voice. Stored in the recognition result field is a recognition result having the largest evaluation value obtained by execution of the voice recognition software 151. The CPU 11 stores a recognition result, which has the largest evaluation value among candidates of a recognition result, in the recognition result field in text format. Moreover, the CPU 11 stores an evaluation value corresponding to the stored recognition result in accordance with the recognition result.

The CPU 11 refers to the date time information outputted from the clock unit 18 and stores the recognized date and time in the recognition date time field. Stored in the recognition result keyword field is a keyword in a string of words of a recognition result, which matches a candidate keyword prestored in the storage unit 15. The CPU 11 compares text of a recognition result with a candidate keyword prestored in the storage unit 15, and stores a keyword in the recognition result keyword field when a keyword matching the text exists. In the example illustrated in FIG. 3, a recognition result of "I want to know a new product." is recognized at 11:20:30 on Jun. 2, 2008, and an evaluation value indicative of the accuracy thereof is stored as 85.

Furthermore, since "new product" is stored as a candidate keyword, "new product" is stored in the recognition result file 153 as a recognition result keyword. The CPU 11 reads out guidance information 51 concerning the recognition result keyword from the guidance information DB 154 and displays the guidance information 51. The present embodiment is not limited to the description of the present embodiment explaining an example wherein the guidance information 51 is displayed focusing on a recognition result keyword, for ease of explanation. Guidance information 51 corresponding to the full text of a recognition result, e.g., "I want to know a new product." may be prepared in the guidance information DB 154, so that the aforementioned guidance information 51 is read out and displayed at the display unit 14.

FIG. 4 is an explanatory drawing illustrating a record layout of the guidance information DB 154. The guidance information DB 154 stores guidance information 51 and editing information in accordance with a keyword for a recognition result of recognition by the voice recognition software 151. The guidance information DB 154 includes a recognition result keyword field, a guidance information field and an editing information field. Stored in the recognition result keyword field is a recognition result keyword. In the present example, keywords such as new product and install are stored. In the guidance information field, guidance information 51 to be provided to the operator is stored in accordance with a recognition result keyword. The following description will explain an example wherein information concerning a sold personal computer is displayed as guidance information 51.

For example, in the case of a new product, information such as the model number, the price and the release date is stored as latest model information concerning a desktop personal computer. Moreover, information concerning a hyperlink for displaying detailed information, such as the CPU, the capacity of the hard disk and associated software, of a new product is stored. In the example illustrated in FIG. 4, a hyperlink is set for a character part "link" in parentheses [ ] in "link . . . to details of specifications", and is linked to an address described in [ ]. In addition, information such as features and options is stored. The contents of the guidance information DB 154 are prestored, and the operator can input information suitably from the input unit 13 to change the memory contents.

Moreover, when a recognition result keyword is "install", stored in the guidance information field is information to be used by the operator to teach the user the process procedure necessary for installing a variety of software. In the editing information field, information inputted by the operator from the input unit 13 is stored in accordance with both a keyword, which is a recognition result, and guidance information 51. When accepting editing information from the input unit 13, the CPU 11 stores the accepted editing information in the guidance information DB 154. For example, assume that the operator accepts a large number of questions concerning color variation of a desktop personal computer from the user in inquiries concerning a new product. The operator inputs what he or she has noticed from the input unit 13 in order to improve the guidance information 51 by reflecting comments from the user. In the present example, "there are many inquiries concerning color variation." is stored concerning the keyword "new product".

Figure 5:
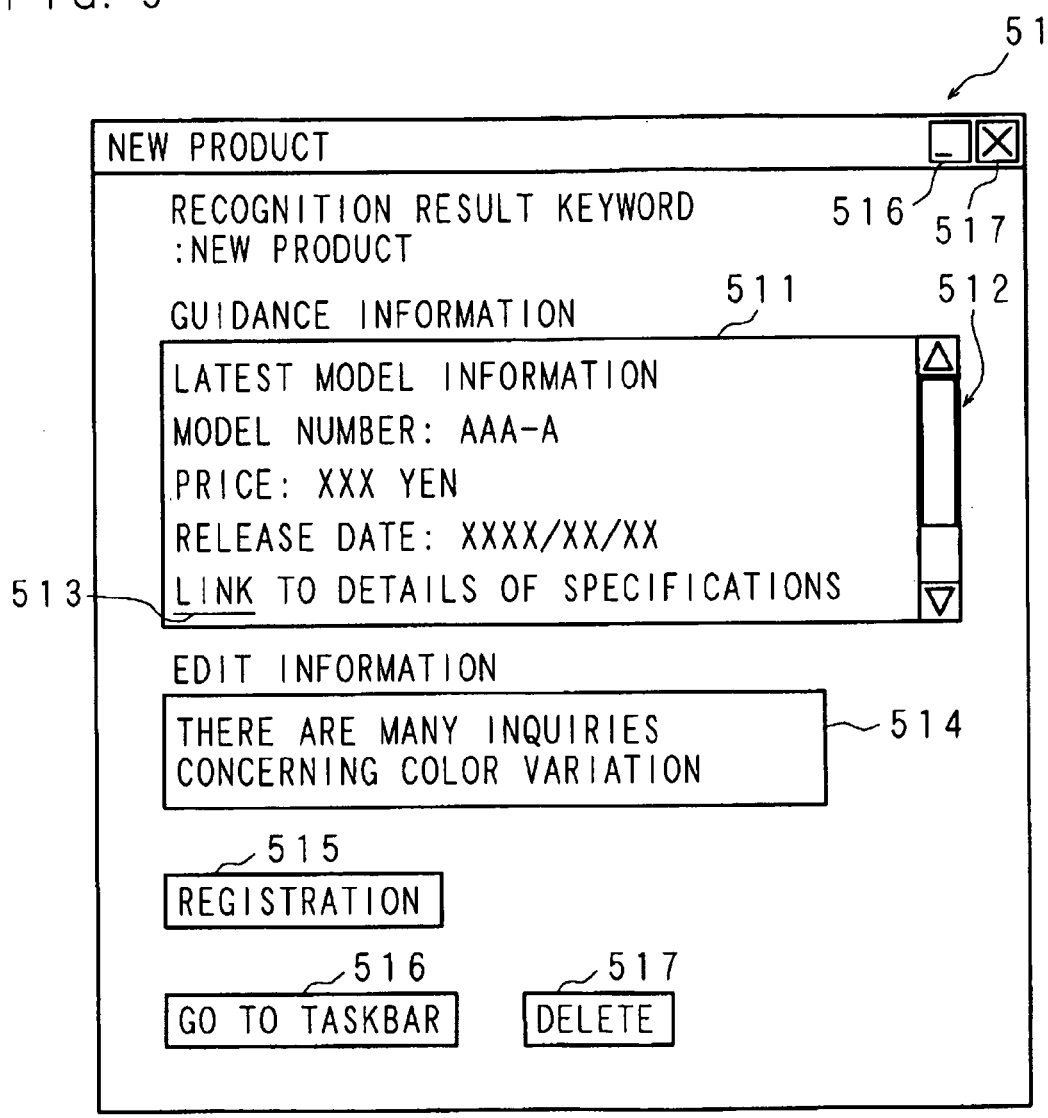
FIG. 5 is an explanatory drawing illustrating an image of guidance information displayed at a display unit.

FIG. 5 is an explanatory drawing illustrating an image of guidance information 51 displayed at the display unit 14. As illustrated in FIG. 5, an example of guidance information 51 concerning a keyword "new product" is displayed at the display unit 14. The guidance information 51 illustrated in FIG. 5 includes a guidance information box 511, a scroll bar 512, a hyperlink 513, an editing information input box 514, a registration button 515, a go-to-taskbar button 516 and a delete button 517. The CPU 11 reads out a template which is prestored in the storage unit 15. The CPU also reads out a keyword and guidance information 51 stored in the guidance information DB 154 and describes the keyword and the guidance information 51 at the template to generate guidance information 51. The CPU 11 displays the generated guidance information 51 at the display unit 14.

The guidance information 51 is displayed as, for example, a pop-up window in the Windows (registered trademark). The window size and the font size of the guidance information 51 to be displayed are prestored in the display mode file 158. The CPU 11 displays guidance information 51, which corresponds to a keyword read out from the guidance information DB 154, at the guidance information box 511 of the guidance information 51. When it may not to display all of the read-out guidance information 51 in the guidance information box 511, the CPU 11 displays a scroll bar 512 in accordance with the guidance information box 511 as in the example illustrated in FIG. 5. In the example illustrated in FIG. 5, the features and options of the guidance information 51 are not displayed. When accepting an operation for the scroll bar 512 from the input unit 13, the CPU 11 displays guidance information 51 based on the aforementioned operation in the guidance information box 511.

The CPU 11 recognizes a URL (Uniform Resource Locator) in [ ] stored in the guidance information DB 154, sets a hyperlink 513 for characters in [ ], and displays the hyperlink 513 in the guidance information box 511. When accepting an operation for the hyperlink 513 from the input unit 13, the CPU 11 displays a linked page at another window which is a browser. A fact which the operator has noticed is inputted in the editing information input box 514 from the input unit 13. When editing information is inputted in the editing information input box 514, the CPU 11 accepts the editing information and displays the editing information in the display unit 14. When accepting an operation for the registration button 515, the CPU 11 stores the editing information, which is inputted in the editing information input box 514, in the guidance information DB 154 in accordance with the keyword and guidance information 51.

The go-to-taskbar button 516 is a button to move a window related to currently displayed guidance information 51 to a taskbar in the Windows (registered trademark) or the like, by an operation for the input unit 13. When accepting input for the go-to-taskbar button 516 from the input unit 13, the CPU 11 temporarily deletes the window of the guidance information 51 and moves the guidance information 51 to the taskbar. In this case, the CPU 11 stores the guidance information 51 temporarily in the RAM 12. When accepting again an operation for guidance information 51 displayed on the taskbar from the input unit 13, the CPU 11 reads out guidance information 51 stored in the RAM 12 and redisplays the window of the guidance information 51 as illustrated in FIG. 5. The delete button 517 is a button to be operated for deleting the guidance information 51 from the display unit 14. When accepting an operation for the delete button 517 from the input unit 13, the CPU 11 deletes display of the guidance information 51 which is currently displayed at the display unit 14.

In such a manner, guidance information 51 corresponding to a keyword based on a recognition result by the voice recognition software 151 is displayed at the display unit 14. The CPU 11 performs display control of guidance information 51 on the basis of an operation from the input unit 13. The CPU 11 stores an operation history for guidance information 51, which is inputted from the input unit 13, in the operation history file 155 of the storage unit 15.

FIG. 6 is an explanatory drawing illustrating the record layout of the operation history file 155, and FIG. 7 is an explanatory drawing illustrating a record layout of a point table 157. Stored in the operation history file 155 is a history of operations from the input unit 13 for guidance information 51 displayed at the display unit 14. The operation history file 155 includes a keyword field, a threshold field, a date and time field, an operation item field and a point field. A keyword for guidance information 51, which is currently displayed at the display unit 14, is stored in the keyword field. In the example illustrated in FIG. 6, a keyword "new product" illustrated in FIG. 5 is stored. A threshold corresponding to the keyword or guidance information 51 concerning a recognition result is stored in a threshold storage unit 156. The threshold will be described later.

When guidance information 51 for a keyword is displayed at the display unit 14 as illustrated in FIG. 5 with the result of voice recognition, the CPU 11 stores the keyword in the keyword field of the operation history file 155. It is to be noted that guidance information 51 corresponding to the keyword may be stored in the operation history file 155, though description thereof is omitted for ease of explanation. The CPU 11 reads out a threshold, which is stored in accordance with the keyword or the guidance information 51, from the threshold storage unit 156. In the example illustrated in the figure, a threshold for the guidance information 51 concerning a keyword "new product" related to a recognition result is stored as "50". When a variety of operations are accepted from the input unit 13, date and time, which is outputted from the clock unit 18, is stored in the date and time field. Stored in the operation item field is an operation item for an operation accepted from the input unit 13.

When accepting an operation for the scroll bar 512 or the like from the input unit 13, the CPU 11 stores date and time outputted from the clock unit 18 in accordance with the operation item. Operation items include "scroll" associated with an operation for the scroll bar 512 and "hyperlink" associated with a click operation for the hyperlink 513. In addition, operation items include "editing information registration" associated with input of information in the editing information input box 514 through the input unit 13 and an operation for the registration button 515. The operation item "go to taskbar" is stored when the go-to-taskbar button 516 is operated from the input unit 13. Moreover, the operation item "redisplay from taskbar" indicates that guidance information 51 was moved to a taskbar, which is not illustrated, and then a program button related to guidance information 51 on the taskbar was operated again from the input unit 13 and the guidance information 51 was displayed at a window as illustrated in FIG. 5.

Moreover, information associated with an operation for the delete button 517 of the input unit 13 is stored for an operation item "delete". In the point field, a point preset according to the operation item is stored in accordance with an operation item and a date and time. The CPU 11 refers to the point table 157, reads out a point stored corresponding to an operation item, and stores the point in the point field. In the point table 157 illustrated in FIG. 7, a point is stored in accordance with an operation item. The point can be stored when the operator inputs a suitable value using the input unit 13. In the point table 157, a high point is given to an operation item "delete," and a lower point is given to other operation items excluding an operation item "delete within a predetermined time period" which will be described later. For example, a point "+3" is stored for an operation item "delete" and a point "+1" is stored for another operation item "scroll."

Moreover, a negative value may be stored, not setting all points as positive values. In the present example, a negative point "−1" is stored in accordance with an operation item "redisplay from taskbar." In addition, the highest point "+5" is stored for an operation item "delete within a predetermined time period." This operation item indicates that guidance information 51 was displayed at the display unit 14 and the delete button 517 was operated within a predetermined time period, e.g., within 3 seconds, without accepting another operation from the input unit 13. When accepting operation input for the delete button 517 within a predetermined time period prestored in the storage unit 15 after guidance information 51 is displayed at the display unit 14, the CPU 11 performs the following process. The CPU 11 reads out a point corresponding to the operation item "delete within a given time period" stored in the point table 157. The CPU 11 stores the date and time outputted from the clock unit 18, the operation item "delete within a given time period" and the point "+5" in the operation history file 155, in accordance with each other. This is for displaying guidance information 51 small next time by adding a larger value to a threshold, since prompt delete of the guidance information 51 by the operator indicates high possibility that the aforementioned information has already been made redundant.

When an operation item "delete" or "delete within a given time period" associated with an operation for the delete button 517 and a corresponding point are stored in the operation history file 155, the CPU 11 adds the points stored in the operation history file 155 to calculate the sum. The CPU 11 then adds the sum obtained by addition to the threshold described above. The CPU 11 stores a threshold obtained by addition in the threshold field. In the present example, the sum of points becomes "+7" with the history of operations. The sum "+7" is then added to an initial threshold "50" to obtain a final threshold "57." The points for the operation items described above are only an example, and the final threshold may decrease when the sum becomes a negative value. A threshold (50 in the example illustrated in FIG. 6) for guidance information 51 displayed at the display unit 14 will be hereinafter referred to as an initial threshold. Moreover, a threshold (57 in the example illustrated in FIG. 6) obtained by adding or subtracting the point sum for an operation for the delete button 517 from the input unit 13 to or from the initial threshold will be referred to as a final threshold. The CPU 11 stores a finally-obtained final threshold in the threshold storage unit 156. The CPU 11 then deletes record corresponding to a keyword for the stored threshold from the operation history file 155.

FIG. 8 is an explanatory drawing illustrating the record layout of the threshold storage unit 156. The threshold storage unit 156 includes a date and time field, a keyword field, a guidance information field, an evaluation value field, an initial threshold field, a final threshold field and a display mode field. Stored in the date and time field is the date and time when guidance information 51 is displayed at the display unit 14, or the date and time when guidance information 51 is deleted from the display unit 14 with an operation for the delete button 517. The following description will explain an example wherein the CPU 11 stores the date and time when guidance information 51 is displayed at the display unit 14.

Stored in the keyword field is a keyword related to a recognition result of voice recognition, and stored in the guidance information field is guidance information 51 corresponding to the keyword. Any one of a keyword and guidance information 51 may be stored in the threshold storage unit 156, though both are stored in the example for explaining the present embodiment. Stored in the evaluation value field is an evaluation value indicative of the accuracy of a recognition result of voice recognition. The CPU 11 stores an evaluation value, which indicates the accuracy of a recognition result obtained by a recognition process by the voice recognition software 151, in the threshold storage unit 156 in accordance with a keyword and guidance information 51. The explanation of the present embodiment is based on the assumption that an evaluation value is a value between 0 and 100.

In the initial threshold field, an initial threshold to be used for deciding a display mode for displaying guidance information 51 at the display unit 14 is stored in accordance with a keyword and guidance information 51. The stored initial threshold is a value equal to the final threshold obtained when the same guidance information 51 was displayed at the display unit 14 and deleted. For example, guidance information 51 concerning a keyword "new product" is displayed at the display unit 14 at 10:20:35 on Jun. 2, 2008. It is to be understood that the initial threshold was 45 during the initiation of display and rose to the final threshold 50 at the time of delete. Then, when the CPU 11 redisplays guidance information 51 concerning a keyword "new product" at the display unit 14 on 11:21:35 on the same day, the initial threshold becomes 50 which was the final threshold at the last display. It is to be noted that the following explanation is based on the assumption that a threshold is a value between 0 and 100, similar to the evaluation value. When a final threshold at the last display does not exist, an initial value "30" prestored in the storage unit 15 may be used.

The CPU 11 then stores a history of an operation from the input unit 13 in the operation history file 155 as described above. The CPU 11 then stores, in the threshold storage unit 156, a final threshold obtained by adding the point sum, which is obtained when an operation item "delete" or "delete within a given time period" is stored in the operation history file 155, to the initial threshold. A mode of display of guidance information 51 at the display unit 14 is stored in the display mode field. The CPU 11 compares the evaluation value with the initial threshold, and sets the display mode as large, medium or small on the basis of the magnitude relation. The example explained in the present embodiment wherein medium is the normal size and a display mode is divided into three stages of large, medium and small on the basis of the normal size is only an example, and a display mode may be changed suitably, including a change to 5 stages.

The following description is based on the assumption that a display mode is set as large when the evaluation value is larger than or equal to a value obtained by adding a given value to the initial threshold, and a display mode is set as small when the evaluation value is smaller than or equal to a value obtained by subtracting a given value from the initial threshold. A display mode is set as medium in the other case, i.e., when the evaluation value is larger than a value obtained by subtracting a given value from the initial threshold and smaller than a value obtained by adding a given value to the initial threshold. The CPU 11 reads out a given value (e.g., 10) prestored in the storage unit 15, decides a display mode by comparing a value obtained by adding or subtracting a given value to and from the initial threshold with the evaluation value, and stores the display mode in the threshold storage unit 156. In the example illustrated in FIG. 8, a display mode for the example of 11:21:35 is stored as large since the evaluation value is sufficiently large with respect to the initial threshold. The example of a given value is only an example, and it is to be understood that another value or 0 may be used.

FIG. 9 is an explanatory drawing illustrating the record layout of the display mode file 158. The display mode file 158 includes a display mode field, a window size field and a font size field. In the display mode file 158, the window size of guidance information 51 and the font size in the guidance information 51 are stored in accordance with a display mode. "large," "medium" and "small" described above are stored in the display mode field. In the window size field, the window size of display of guidance information 51 is stored in accordance with a display mode. In particular, the coordinate value of an area to be covered by a window includes the horizontal direction of the display unit 14 on the x-axis direction and the vertical direction on the y-axis direction. The coordinate value is stored in the window size field. A display mode "large" has the largest window size and the window size is stored as (300, 300).

Next, the window size of a display mode "medium," which is the reference size, is stored as (200, 200). The window size of a display mode "small," which has the smallest display area, is stored as (100, 100). In the font size field, a font size of display of text in guidance information 51 is stored for each display mode. The display mode "large" is stored to have the largest font size "30," the display mode "medium," which is the reference size, is stored to have a font size "20," and the display mode "small" is stored to have the smallest font size "10." It is to be noted that the operator can set the content stored in the display mode file 158 suitably from the input unit 13.

The CPU 11 reads out a display mode stored in the threshold storage unit 156, and reads out a window size and a font size corresponding to the read-out display mode from the display mode file 158. The CPU 11 then reads out guidance information 51, changes the size of the window of the guidance information 51 on the basis of the read-out window size as above mentioned, and changes the text size in the guidance information 51 according to the font size. The CPU 11 displays guidance information 51, which is obtained after the change, at the display unit 14. By including such a structure, guidance information 51A, which has a window size and a font larger than the reference sizes, is displayed when the display mode is "large," as illustrated in FIG. 1. Similarly, guidance information 51B, which has the reference window size and the reference font size, is displayed when the display mode is "medium."

Furthermore, guidance information 51C, which has a window size and a font size smaller than the reference sizes, is displayed when the display mode is "small." A font may be changed according to the display mode, though explained in the present embodiment is an example in which the window size and the font size are changed. For example, a bold Gothic font may be used for a display mode "large," a normal Gothic font may be used for a display mode "medium," and a Century font may be used for a display mode "small." Moreover, the color of the window of guidance information 51, or color of characters may be changed according to the display mode. For example, a red window frame and red characters may be used for a display mode "large," a yellow window frame and yellow characters may be used for a display mode "medium," and a blue window frame and blue characters may be used for a display mode "small." In addition, a loud speaker (not illustrated) may include construction to output beep sound twice at the time of display of guidance information 51 when the display mode is "large." Moreover, the loud speaker may include construction to output beep sound once at the time of display of guidance information 51 when the display mode is "medium," and not to output beep sound at the time of display when the display mode is "small."

Figure 10A:
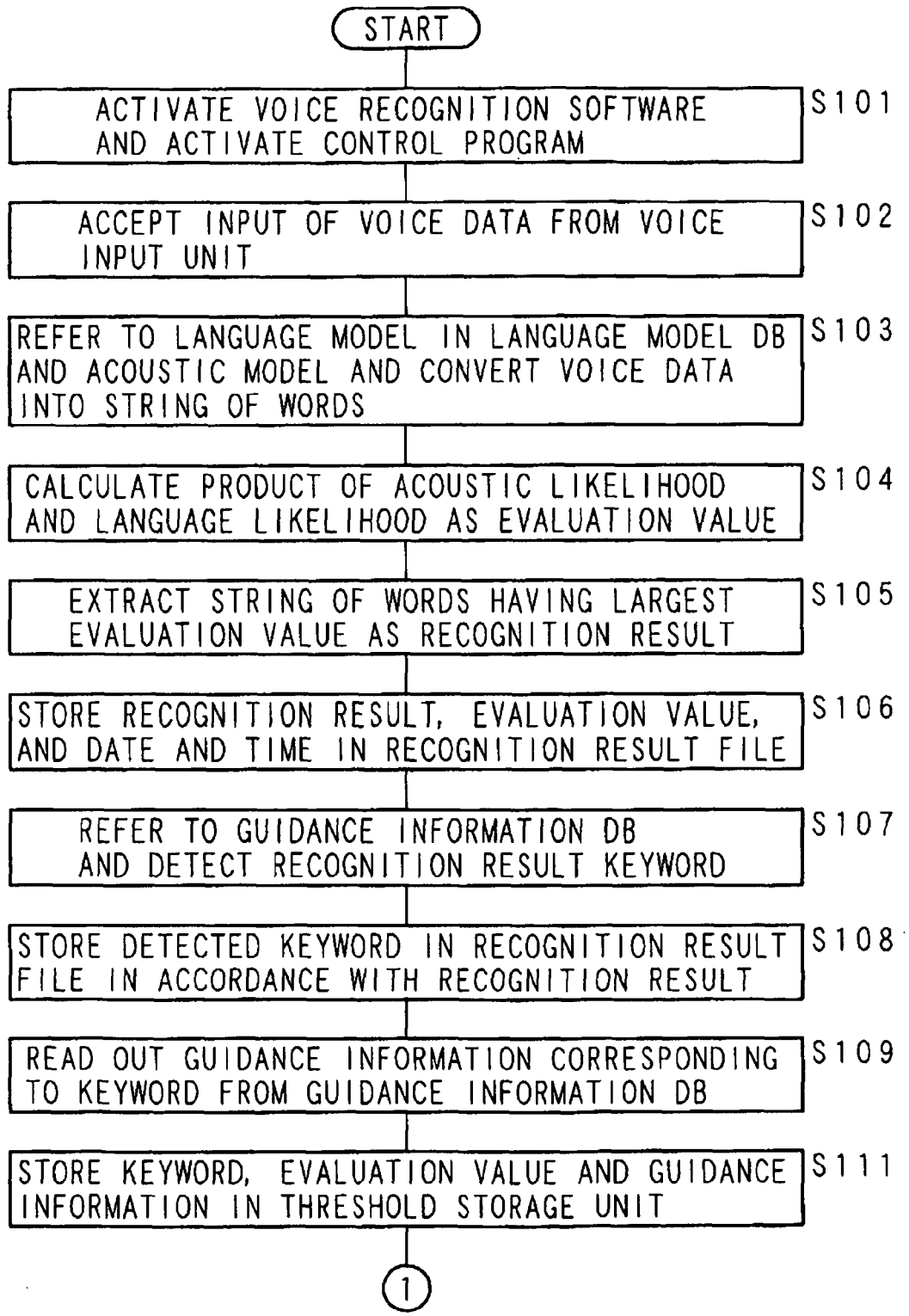
FIGS. 10A, 10B and 10C are operation charts illustrating the procedure of a display process of guidance information.
Figure 10B:
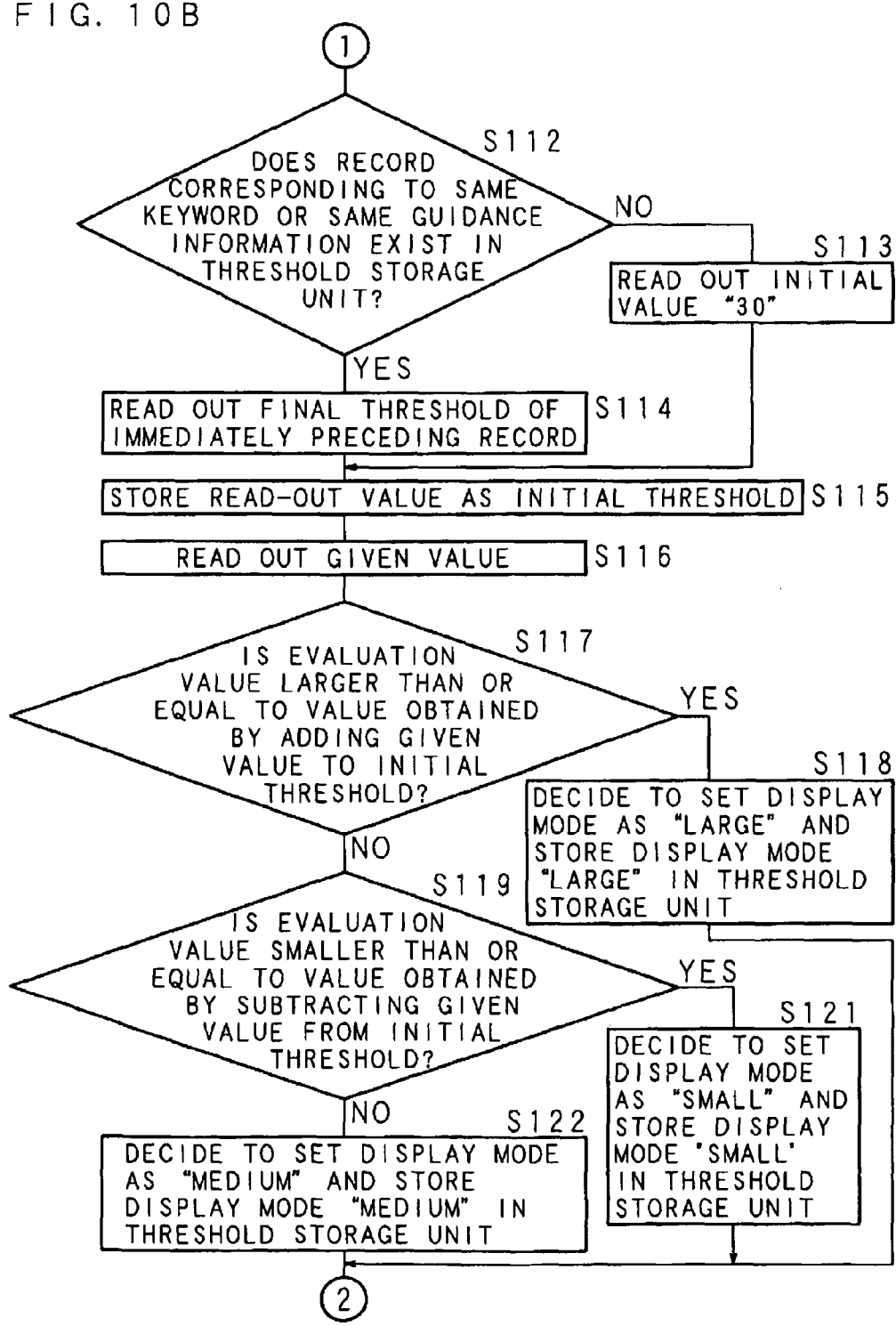
Figure 10C:
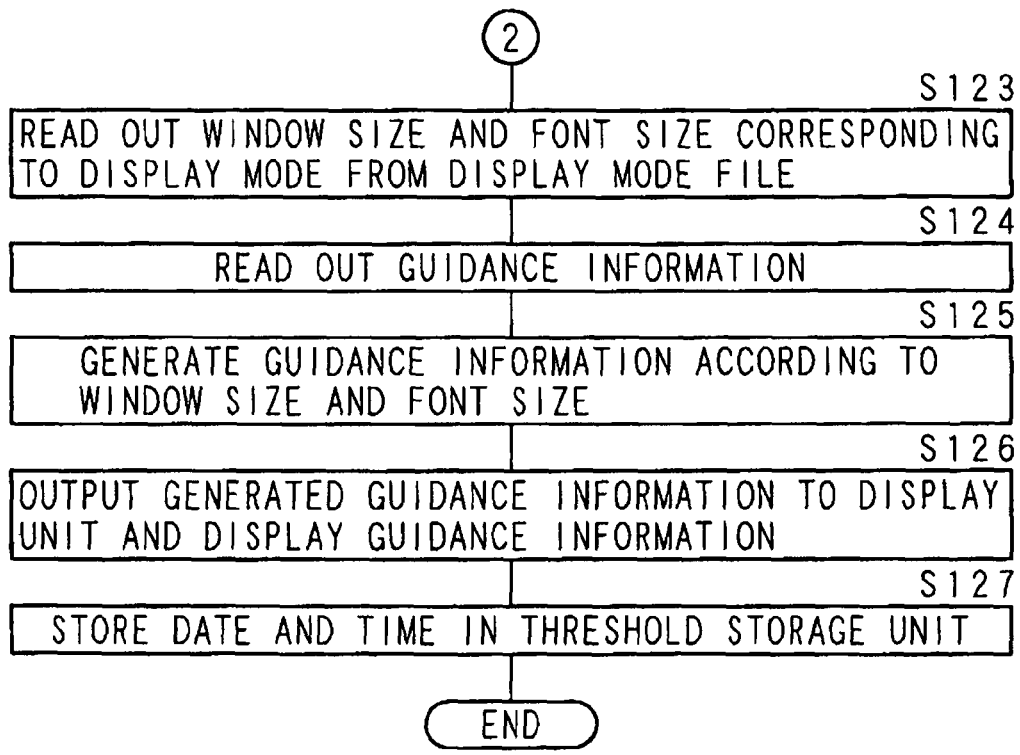

The contents of a display process according to the present embodiment in the above hardware will be explained using operation charts. FIGS. 10A, 10B and 10C are operation charts illustrating the procedure of a display process of guidance information 51. The CPU 11 of the personal computer 1 activates the voice recognition software 151 and the control program 15P (operation S101). The CPU 11 accepts input of voice data from the voice input unit 111 (operation S102).

The CPU 11 refers to a language model stored in the language model DB 152 and an acoustic model stored in the storage unit 15, and converts the voice data into a string of words by a heretofore known voice recognition process (operation S103).

The CPU 11 calculates the product of an acoustic likelihood based on a matching likelihood between a string of words and voice data and a language likelihood, which is a likelihood of a string of words based on a language model, as an evaluation value indicative of the accuracy (operation S104). The CPU 11 obtains (stores) the calculated evaluation value into the RAM 12. The CPU 11 extracts a string of words having the largest evaluation value as a recognition result from a plurality of candidates of a string of words (operation S105). As illustrated in FIG. 3, the CPU 11 stores a recognition result, an evaluation value and the date and time outputted from the clock unit 18, in the recognition result file 153 (operation S106).

The CPU 11 refers to the guidance information DB 154 and detects a keyword which matches any word in a string of words of the recognition result (operation S107). The CPU 11 stores the detected keyword in the recognition result file 153 in accordance with the recognition result stored in the operation S106 (operation S108). When a keyword matching a word in a string of words of the recognition result does not exist, it is determined that the question item is new and a series of processing is terminated. The CPU 11 reads out guidance information 51 corresponding to the detected keyword from the guidance information DB 154 (operation S109).

The CPU 11 stores the keyword, the evaluation value and the guidance information 51 in the threshold storage unit 156 as illustrated in FIG. 8 (operation S111). The CPU 11 determines whether a record corresponding to the same keyword or substantially the same guidance information 51 exists in the threshold storage unit 156 or not (operation S112). When determining that substantially the same record exists (YES in operation S112), the CPU 11 determines that the guidance information 51 as above mentioned, has already been displayed at the display unit 14 and reads out a final threshold of the immediately preceding (the latest date and time) record (operation S114). On the other hand, when determining that a record does not exist (NO in operation S112), the CPU 11 determines that the guidance information 51 is displayed at the display unit 14 for the first time and a final threshold does not exist, and reads out the initial value "30" stored in the storage unit 15 (operation S113).

After the process in the operation S113 or S114, the CPU 11 stores the read-out value in the threshold storage unit 156 as an initial threshold in accordance with an evaluation value (operation S115). The present embodiment is not limited to the description of the present embodiment explaining an example in which the final threshold of the last display of the guidance information 51 is used as an initial threshold. For example, any value based on a past final threshold, such as the average of a final threshold of the last time and a final threshold of the last-but-one time, may be used as an initial threshold. The CPU 11 reads out a given value (e.g., 10) prestored in the storage unit 15 (operation S116). The CPU 11 determines whether the evaluation value is larger than or equal to a value obtained by adding the predetermined value to the initial threshold or not (operation S117). When determining that the evaluation value is larger than or equal to the value obtained by addition (YES in operation S117), the CPU 11 decides to set the display mode as "large" and stores the display mode "large" in the threshold storage unit 156 (operation S118). When determining that the evaluation value is smaller than the value obtained by addition (NO in operation S117), the CPU 11 determines whether the evaluation value is smaller than or equal to a value obtained by subtracting the given value from the initial threshold or not (operation S119). When determining that the evaluation value is smaller than or equal to the value obtained by subtracting the given value (YES in operation S119), the CPU 11 decides to set the display mode as "small" and stores the display mode "small" in the threshold storage unit 156 (operation S121).

When determining that the evaluation value is larger than the value obtained by subtracting the given value (NO in operation S119), the CPU 11 decides to set the display mode as "medium" and stores the display mode "medium" in the threshold storage unit 156 (operation S122). The CPU 11 reads out a window size and a font size, which correspond to the display mode, from the display mode file 158 (operation S123). The CPU 11 reads out guidance information 51, which is to be displayed, from the guidance information DB 154 or the threshold storage unit 156 (operation S124). The CPU 11 generates the read-out guidance information 51 according to the window size and the font size read out in the operation S123 (operation S125). In this case, a template including a guidance information box 511, a scroll bar 512, a hyperlink 513, an editing information input box 514, a registration button 515, a go-to-taskbar button 516 and a delete button 517 is read out from the storage unit 15.

The CPU 11 then enlarges the size of the read-out template according to the window size. The CPU 11 describes the guidance information 51 in the guidance information box 511, and sets the scroll bar 512 or the hyperlink 513 suitably. Finally, the CPU 11 changes the size of characters according to the font size. The CPU 11 outputs the generated guidance information 51 to the display unit 14 and the guidance information 51 is displayed (operation S126). The CPU 11 stores the date and time outputted from the clock unit 18 in the threshold storage unit 156 in accordance with the keyword and the guidance information 51 (operation S127). The present embodiment is not limited to the description of the present embodiment explaining an example in which the initial threshold is compared with the evaluation value so as to decide the display mode. A second threshold which is a fixed value may be used as a reference, as long as the display mode is changed according to a value which varies on the basis of an operation and an evaluation value. For example, a second threshold is set as a fixed value "50." It is to be understood that a display mode may be then decided by comparing the magnitude relation between the second threshold and the average value of the evaluation value and a value (the initial threshold in the present embodiment) which varies with an operation. In addition, a second threshold may be set as a fixed range "100-120," and the display mode may be set as the reference size when the sum of the evaluation value and the initial threshold (variable value) falls within the fixed range. When the sum exceeds the fixed range, the guidance information 51 is displayed at the display unit 14 to have a size larger than the reference size. On the other hand, when the sum is smaller than the fixed range, the guidance information 51 is displayed at the display unit 14 to have a size smaller than the reference size.

Figure 11A:
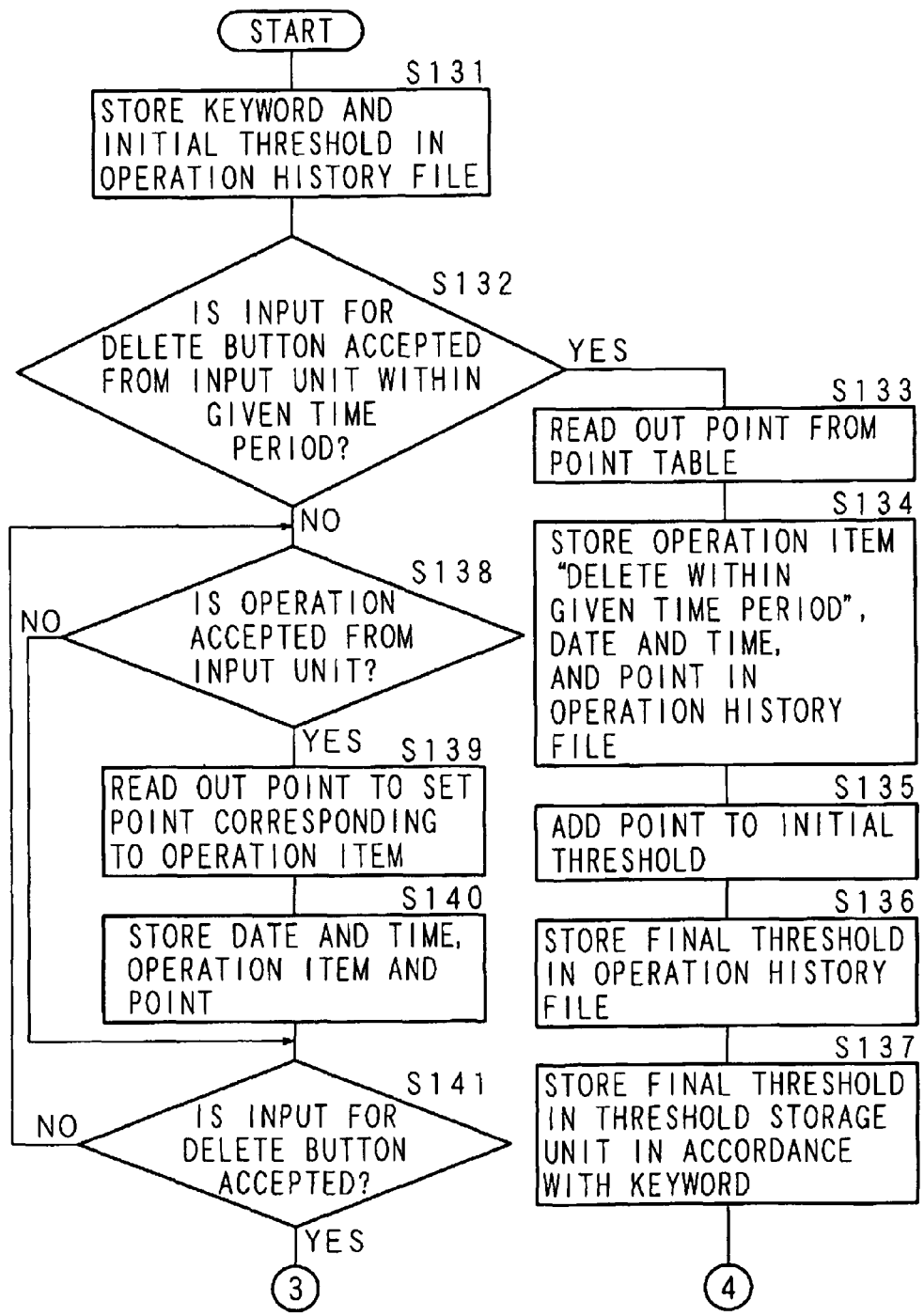
FIGS. 11A and 11B are operation charts illustrating the procedure of a threshold varying process.
Figure 11B:
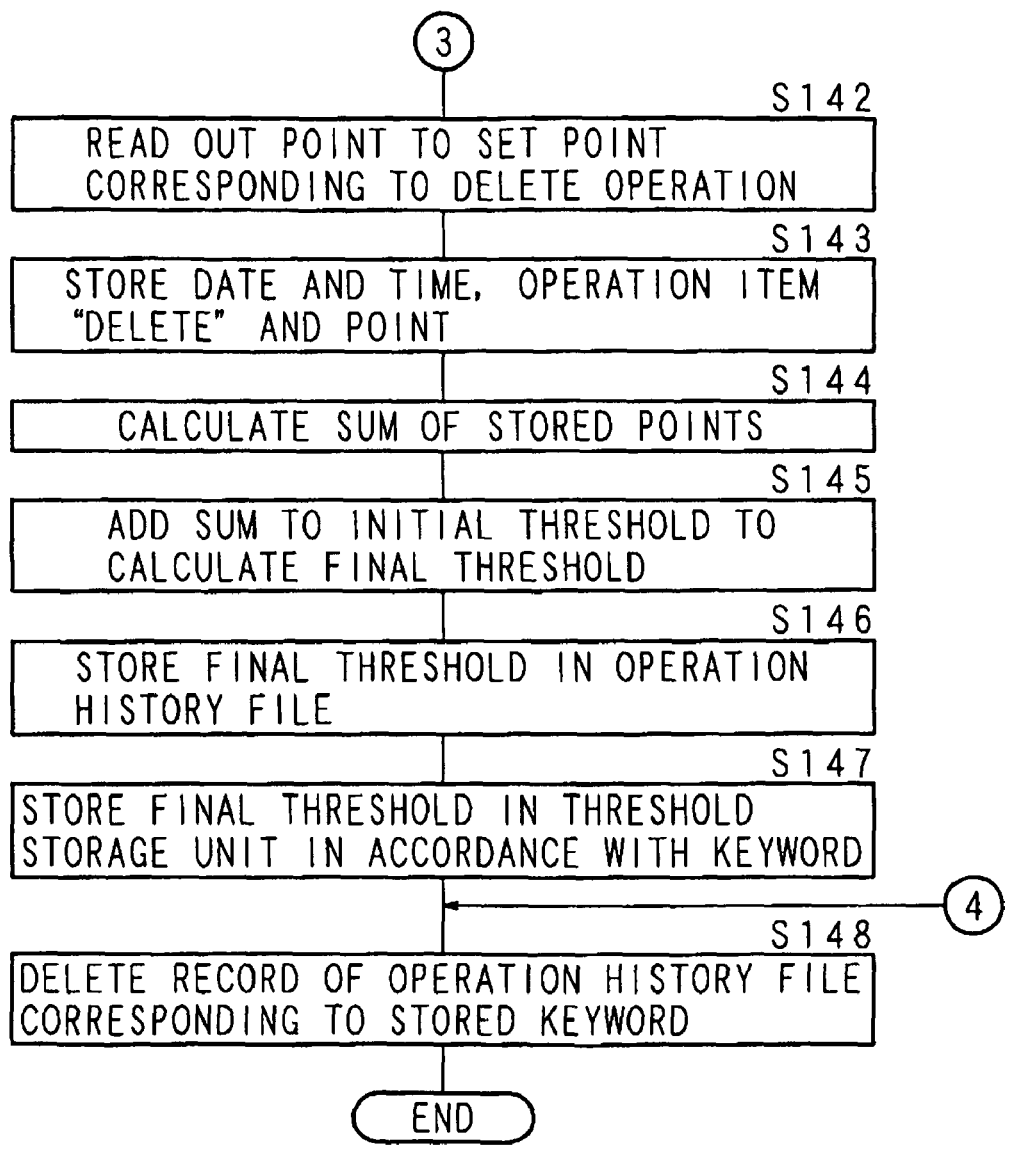

FIGS. 11A and 11B are an operation chart illustrating the procedure of a threshold varying process. The CPU 11 reads out a keyword and an initial threshold, which correspond to the guidance information 51 displayed at the display unit 14, from the threshold storage unit 156. The CPU 11 stores the read-out keyword and initial threshold in the operation history file 155 as illustrated in FIG. 6 (operation S131). The CPU 11 determines whether input for the delete button 517 has been accepted from the input unit 13 within a predetermined time period after storage into the storage unit 15 or not (operation S132). When determining that input has been accepted (YES in operation S132), the CPU 11 reads out a point corresponding to the operation item "delete within a predetermined time period" from the point table 157 (operation S133).

The CPU 11 stores the operation item "delete within a predetermined time period," the date and time, and the point in the operation history file 155 (operation S134). The CPU 11 adds the point to the initial threshold stored in the operation history file 155 in the operation S131 (operation S135) to calculate a final threshold. The CPU 11 stores the calculated final threshold in the operation history file 155 in accordance with the keyword (operation S136). The CPU 11 also stores the final threshold in the threshold storage unit 156 in accordance with the keyword (operation S137).

When input for the delete button 517 has not been accepted within a predetermined time period in the operation S132 (NO in operation S132), the CPU 11 determines whether an operation for any element other than the delete button 517 has been accepted from the input unit 13 or not (operation S138). When determining that an operation for any element other than the delete button 517 has been accepted (YES in operation S138), the CPU 11 reads out a corresponding point from the point table 157 in order to set a point corresponding to an operation item related to the accepted operation (operation S139). The CPU 11 stores the date and time outputted from the clock unit 18, the operation item and the point in the operation history file 155 (operation S140).

When determining that an operation has not been accepted from the input unit 13 (NO in operation S138), the CPU 11 skips the process in the operations S139 and S140. After the process as above mentioned, and after the process in the operation S140, the CPU 11 determines whether input for the delete button 517 has been accepted again or not (operation S141). When determining that input for the delete button 517 has not been accepted (NO in operation S141), the CPU 11 proceeds to the operation S138 and repeats the above process. In such a manner, an operation history for guidance information 51 is stored sequentially.

When determining that input for the delete button 517 has been accepted (YES in operation S141), the CPU 11 reads out a corresponding point from the point table 157 in order to set a point corresponding to the delete operation (operation S142). The CPU 11 stores the date and time outputted from the clock unit 18, the operation item "delete" and the read-out point in the operation history file 155 (operation S143). The CPU 11 calculates the sum of points corresponding to the respective operation items, which are stored in the operation history file 155 in the operations S140 and S143 (operation S144). The CPU 11 adds the sum to the initial threshold to calculate a final threshold (operation S145). The CPU 11 stores the final threshold in the operation history file 155 in accordance with the keyword (operation S146).

The CPU 11 also stores the final threshold in the threshold storage unit 156 in accordance with the keyword (operation S147). After the process as above mentioned or after the process in the operation S137, the CPU 11 deletes the record, in which the final threshold is stored, corresponding to the keyword in the operation history file 155 (operation S148). Here, the final threshold stored in the threshold storage unit 156 is used as an initial threshold for the next display of the guidance information 51, compares the threshold with an evaluation value, and the display mode is changed based on the comparison result. In such a manner, it becomes possible to display the most suitable guidance information 51 according to the level of skill of the operator, since a threshold is varied according to the operation history for the guidance information 51 by the operator so as to change the display mode. Moreover, the efficiency of guidance service by the operator may be enhanced since information is displayed in the most suitable mode according to the situation.

Embodiment 2

Embodiment 2 relates to a mode for changing a threshold on the basis of the history of an evaluation value and a threshold. FIG. 12 is an explanatory drawing illustrating the record layout of a threshold storage unit 156 according to Embodiment 2. It is to be noted that an evaluation value, a threshold and the like are displayed in chronological order for each keyword in FIG. 12, for ease of explanation. The CPU 11 performs a threshold changing process, which will be described later, on the basis of the memory content of the threshold storage unit 156. The CPU 11 counts the number of times a result that a stored evaluation value is larger than the initial threshold or the final threshold has been obtained. The present embodiment is not limited to the following explanation based on the assumption that a threshold to be used for the aforementioned counting process is the initial threshold. The final threshold may be used, or the average of the initial threshold and the final threshold may be used.

The CPU 11 then performs a process for decreasing the initial threshold or the final threshold by a given value when the counted number of times is larger than or equal to the number of times (e.g., 3 times) stored in the storage unit 15. The given value is prestored in the storage unit 15. Moreover, though the description of the present embodiment explains an example wherein the initial threshold is to be decreased, it is to be understood that the final threshold may be decreased on the contrary. By including such a structure, when a process using an evaluation value larger than a threshold to set a display mode as "large" is performed a plurality of times, it is determined that the guidance information 51 as above mentioned, is beneficial and a process for decreasing the threshold is performed. The present embodiment is not limited to the description of the present embodiment, which uses the condition that the number of times a result that an evaluation value is larger than the threshold has been obtained is larger than or equal to a given number of times. A similar process may also be performed when the result is obtained a given number of times within a given time period.

Focus on the history of the last three times of a keyword "new product" as illustrated in FIG. 12. The number of times an evaluation value is larger than the initial threshold is larger than or equal to three times. Accordingly, for displaying guidance information 51 at 11:23:35 on Jun. 2, 2008, an initial threshold "57" obtained by subtracting 3 from the final threshold "60" of the last time is to be stored in the threshold storage unit 156.

On the contrary, when the number of times a result that an evaluation value is smaller than the threshold has been obtained is larger than or equal to a given number of times, the CPU 11 performs a process for increasing the initial threshold. Focus on the history of the last three times of a keyword "install" as illustrated in FIG. 12. The number of times an evaluation value is smaller than the initial threshold is larger than or equal to three times. Accordingly, for displaying guidance information 51 at 11:58:35 on Jun. 2, 2008, an initial threshold "81" obtained by adding 3 to the final threshold "78" of the last time is to be stored in the threshold storage unit 156. The display mode is decided on the basis of the initial threshold obtained after the change and the evaluation value.

Figure 13A:
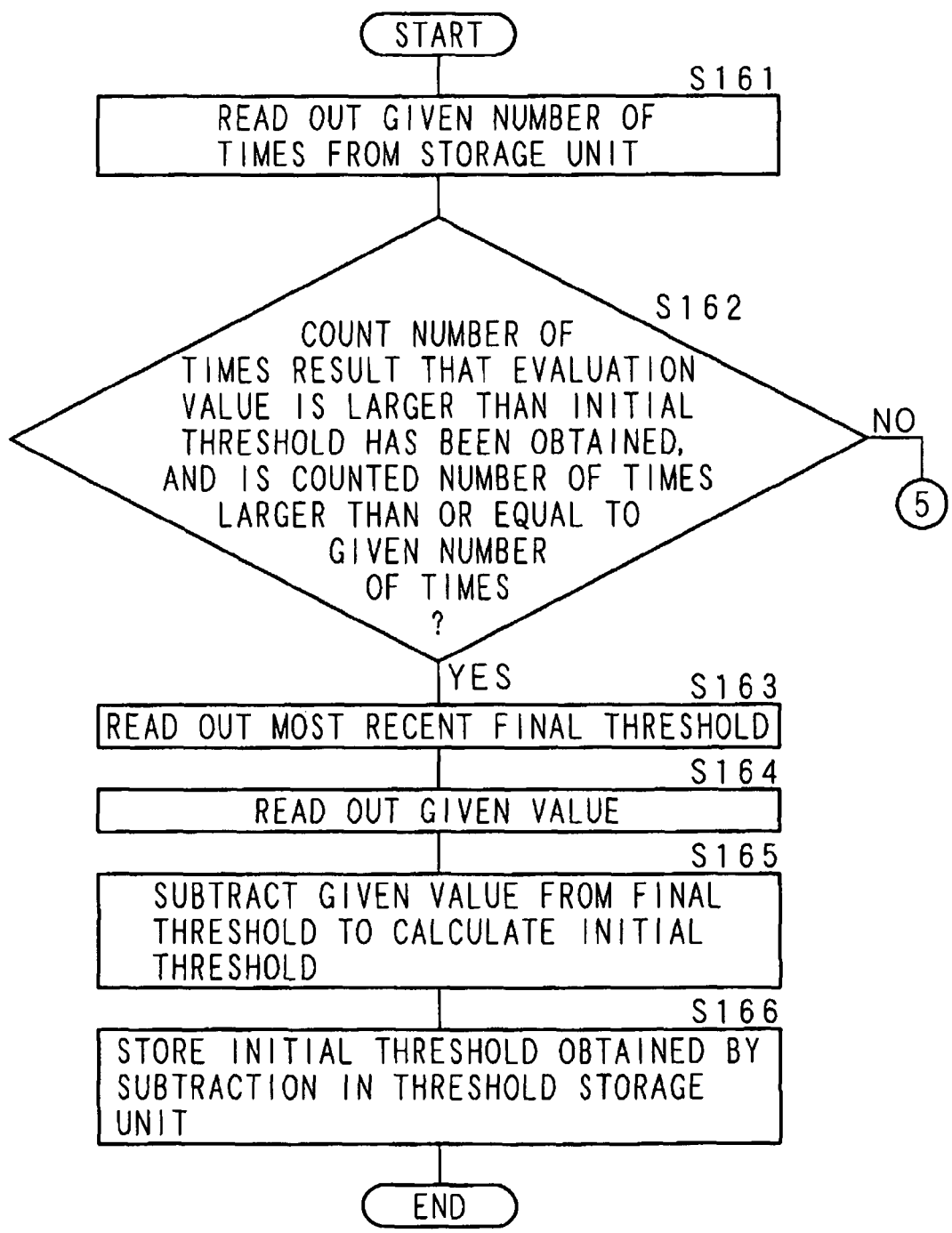
FIGS. 13A and 13B are operation charts illustrating the procedure of an initial threshold changing process.
Figure 13B:
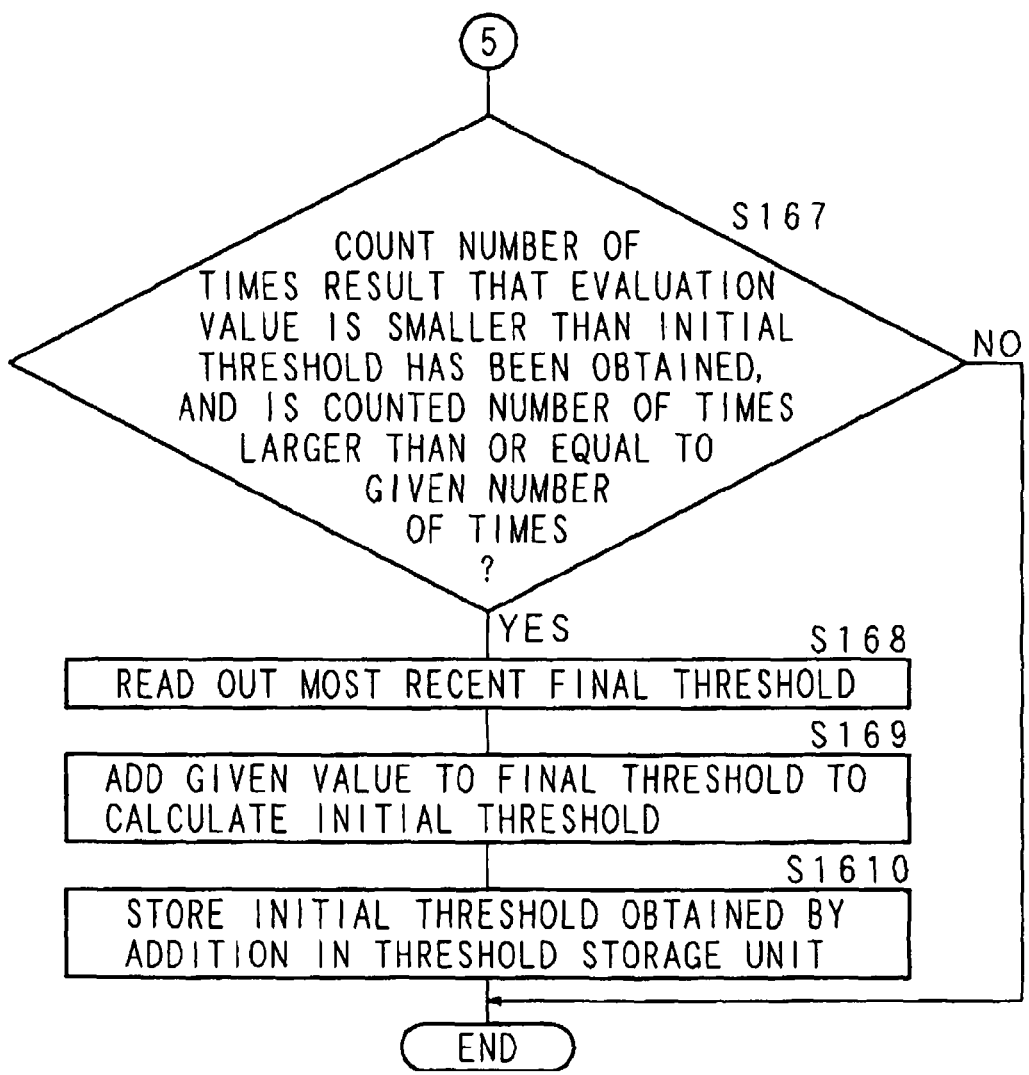

FIGS. 13A and 13B are operation charts illustrating the procedure of an initial threshold changing process. The CPU 11 reads out a given number of times from the storage unit 15 (operation S161). The CPU 11 refers to the threshold storage unit 156, counts the number of times a result that an evaluation value is larger than the initial threshold has been obtained, and determines whether the aforementioned number of times is larger than or equal to the given number of times or not (operation S162). When determining that the number of times is larger than or equal to the given number of times (YES in operation S162), the CPU 11 reads out a final threshold related to the most recent record in chronological order (operation S163). The CPU 11 reads out a given value stored in the storage unit 15 (operation S164).

The CPU 11 subtracts the read-out given value from the final threshold to calculate an initial threshold (operation S165). It is to be noted that a threshold may be multiplied by a coefficient smaller than 1 for decreasing the threshold. The CPU 11 stores an initial threshold obtained by subtraction in the threshold storage unit 156 as illustrated in FIG. 12 (operation S166). After the process in the operation S166, the CPU 11 terminates the process. When determining in the operation S162 that the number of times is smaller than the given number of times (NO in operation S162), the CPU 11 refers to the threshold storage unit 156, counts the number of times a result that an evaluation value is smaller than the initial threshold has been obtained, and determines whether the counted number of times is larger than or equal to the given number of times or not (operation S167). When determining that the counted number of times is smaller than the given number of times (NO in operation S167), the CPU 11 terminates a series of processing.

On the other hand, when determining that the counted number of times is larger than or equal to the given number of times (YES in operation S167), the CPU 11 reads out a final threshold related to the most recent record in chronological order (operation S168). The CPU 11 adds the given value read out in the operation S164 to the final threshold to calculate an initial threshold (operation S169). A threshold may be multiplied by a coefficient larger than 1 for increasing the threshold. The CPU 11 stores the initial threshold obtained by addition in the threshold storage unit 156 as illustrated in FIG. 12 (operation S1610). By including such a structure, guidance information 51 which has been determined to be of importance is continuously displayed large, and guidance information 51 which has been determined to be of no importance is displayed small on the contrary.

Since the present Embodiment 2 includes a structure described above and other structures are the same as those of Embodiment 1, like codes are used to refer to like parts and detailed explanation thereof is omitted.

Embodiment 3

Embodiment 3 relates to a mode for a case wherein operation input for guidance information 51 is not accepted from the input unit 13 within a given time period. FIG. 14 is an explanatory drawing illustrating the record layout of a point table 157 according to Embodiment 3. In addition to the record in Embodiment 1, operation items "non-operation for a given time period" and "program termination" are stored in the operation item field. Moreover, a point "+2" is stored in accordance with the operation item "non-operation for a given time period" and a point "−1" is stored in accordance with the operation item "program termination." Sometimes, no operation is accepted from the input unit 13 within a given time period (e.g., 5 minutes) after displaying guidance information 51 at the display unit 14 as illustrated in FIG. 1 or after accepting input for the scroll bar 512 or the like from the input unit 13.

In this case, the CPU 11 determines that an operation for guidance information 51 has not been accepted from the input unit 13 and reads out a point "+2" corresponding to the operation item "non-operation for a given time period" from the point table 157. The CPU 11 stores the operation item "non-operation for a given time period" and the point "+2" in the operation history file 155. FIG. 15 is an explanatory drawing illustrating the record layout of the operation history file 155 according to Embodiment 3. For example, regarding a keyword "new product", it is to be understood that an operation for the scroll bar 512 has been performed from the input unit 13 at 11:20 on Jun. 2, 2008.

For 5 minutes thereafter, an operation for guidance information 51 is not accepted from the input unit 13. In this case, the CPU 11 stores the operation item "non-operation for a given time period" in the operation history file 155 and stores the corresponding point "+2." When an operation for the guidance information 51 is not performed within a given time period, the CPU 11 performs a process for deleting the guidance information 51 from the display unit 14 in addition to performing the aforementioned process. The CPU 11 then calculates the sum of points given to the aforementioned guidance information 51. In the example illustrated in FIG. 15, a point to be used for change is "+3," which is obtained by addition of "+1" and "+2." The CPU 11 adds the point to be used for change to the initial threshold to obtain the final threshold. In the example illustrated in FIG. 15, the initial threshold "50" becomes the final threshold "53" by a delete process associated with non-operation for a given time period.

In addition, the program of the voice recognition software 151 and the control program 15P (which will possibly be hereinafter represented by a program) are sometimes terminated by termination of service, a change of the operator, a break or the like. In this case, the CPU 11 deletes all guidance information 51 displayed at the display unit 14 and terminates the program. As illustrated in FIG. 14, an operation item "program termination" is stored in the point table 157 in accordance with a termination operation of the program. Moreover, a point "−1" is stored in the point table 157 in accordance with the operation item "program termination."

When accepting a termination operation of the program from the input unit 13, the CPU 11 reads out a point corresponding to the operation item "program termination" from the point table 157. The CPU 11 then stores the date and time outputted from the clock unit 18, the operation item and the point in the operation history file 155 as illustrated in FIG. 15. The CPU 11 further calculates the sum of points stored in the operation history file 155. In the example illustrated in FIG. 15, the sum "0" is calculated by addition of a point "+1" associated with an operation for the scroll bar 512 and a point "−1" associated with program termination. The CPU 11 adds the sum to the initial threshold to obtain a final threshold. The CPU 11 stores the obtained final threshold in the operation history file 155. The aforementioned final threshold is stored also in the threshold storage unit 156 as described in Embodiment 1. In the example illustrated in FIG. 15, the sum "0" is added to the initial threshold "50" and a final threshold "50" may be obtained.

Figure 16A:
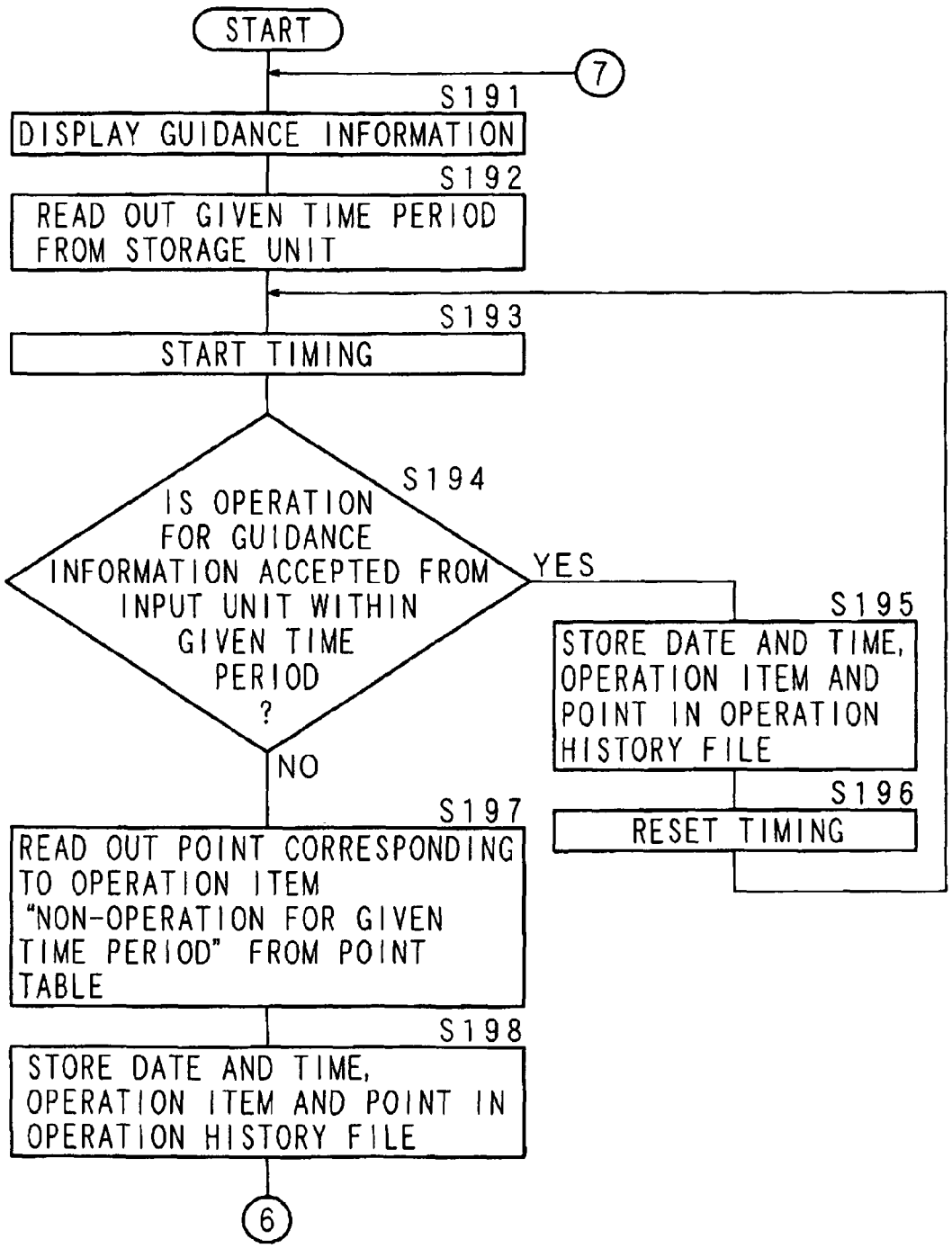
FIGS. 16A, 16B and 16C are operation charts illustrating the procedure of a delete process and a program termination process.
Figure 16B:
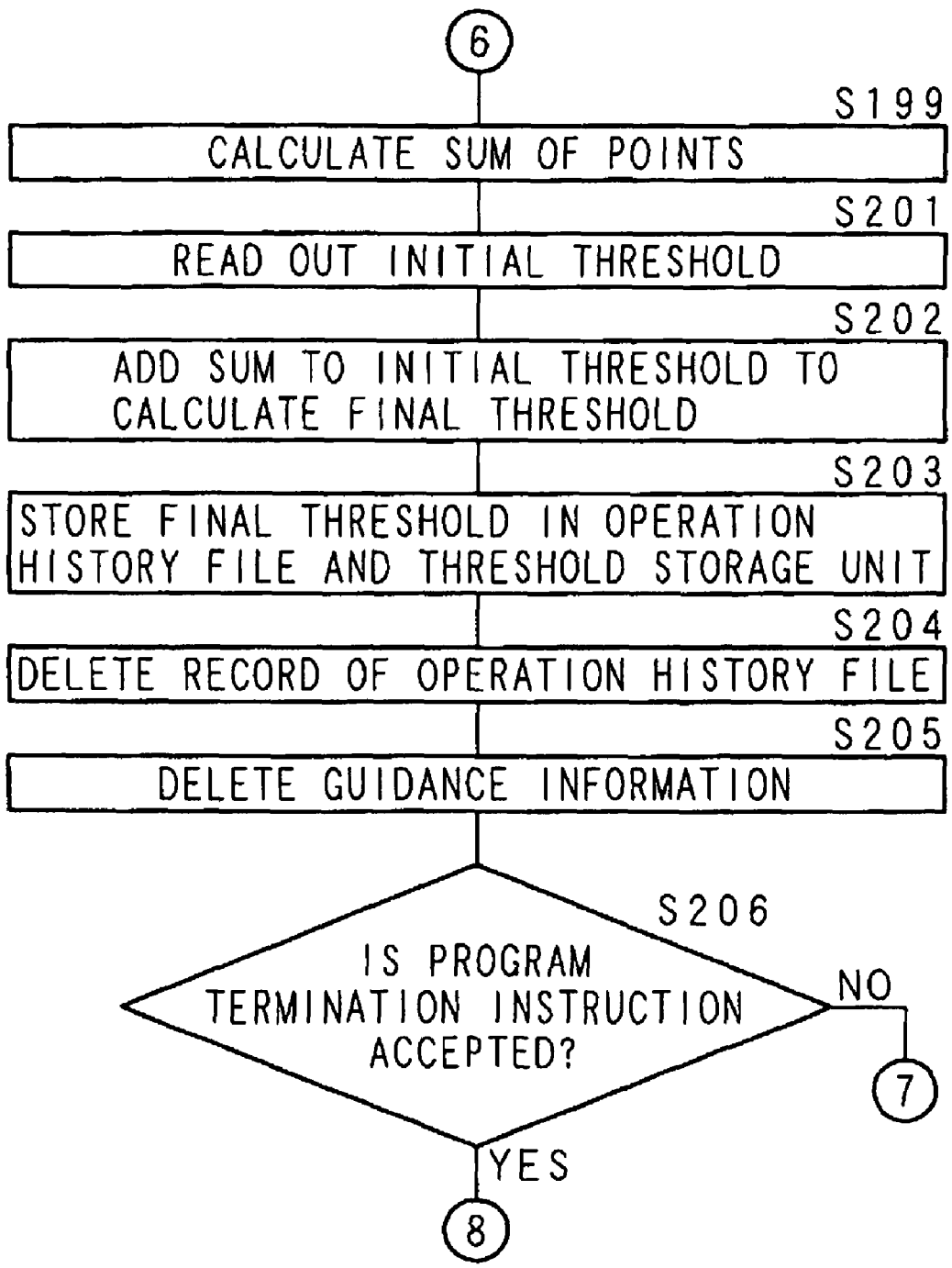
Figure 16C:
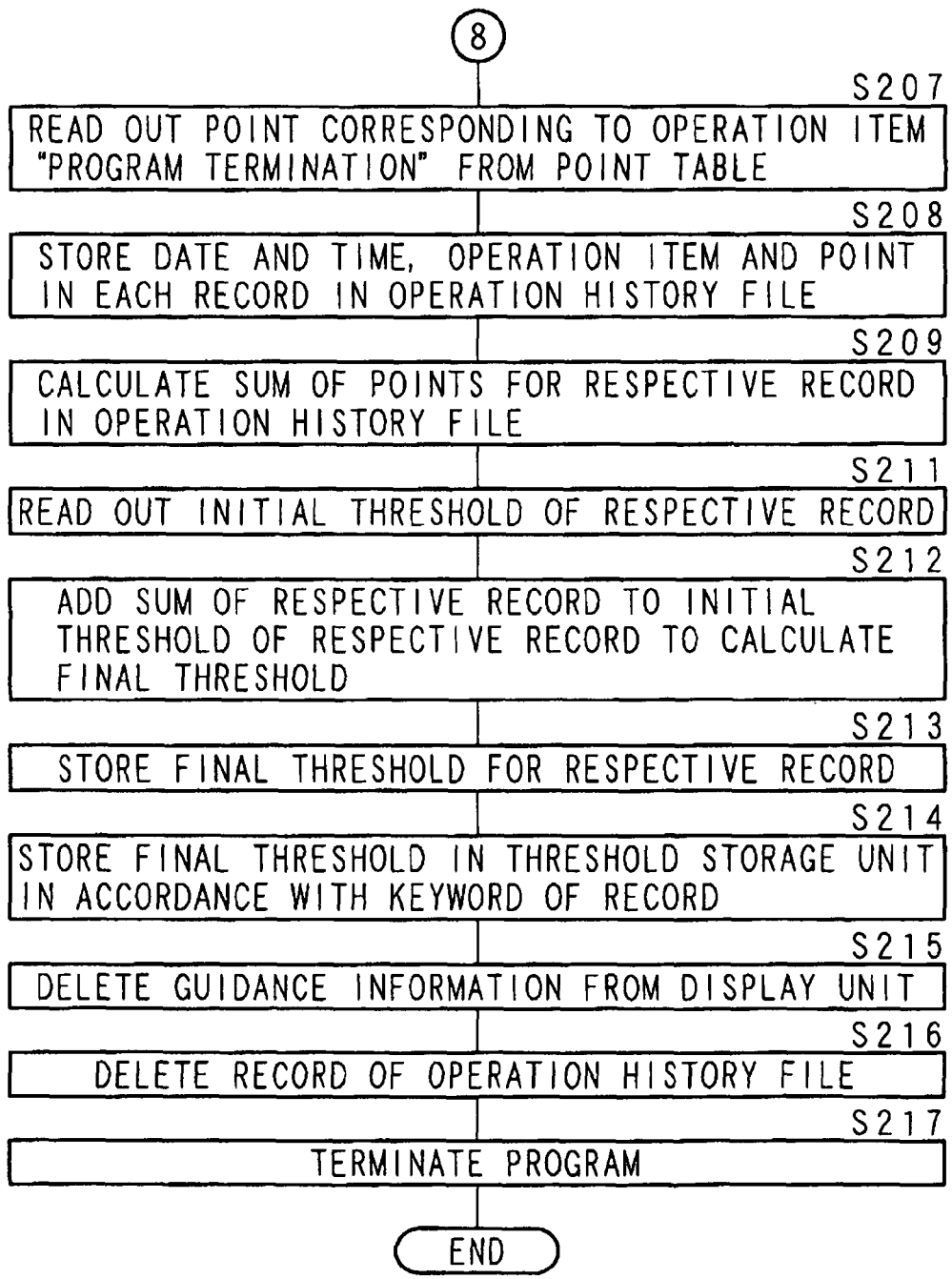

FIGS. 16A, 16B and 16C are operation charts illustrating the procedure of a delete process and a program termination process. The CPU 11 displays guidance information 51 at the display unit 14 by the process described in Embodiment 1 (operation S191). The CPU 11 reads out a prestored given time period from the storage unit 15 (operation S192). The read-out given time period may be stored in the storage unit 15 by inputting a suitable time period from the input unit 13. The CPU 11 starts timing on the basis of output from the clock unit 18 (operation S193). The CPU 11 determines whether an operation for target guidance information 51 has been accepted from the input unit 13 within a given time period after starting timing or not (operation S194).

When determining that an operation has been accepted (YES in operation S194), the CPU 11 stores the date and time, the operation item and the point in the operation history file 155 by the process described in Embodiment 1 (operation S195). The CPU 11 resets timing which has been started in the operation S193 (operation S196). The CPU 11 then returns the process to the operation S193 and repeats the above process. On the other hand, when determining in the operation S194 that an operation has not been accepted within a given time period (NO in operation S194), the CPU 11 reads out a point corresponding to the operation item "non-operation for a given time period" from the point table 157 (operation S197).

The CPU 11 refers to the date and time outputted from the clock unit 18 and stores the date and time, the operation item and the point in the operation history file 155 as illustrated in FIG. 15 (operation S198). The CPU 11 calculates the sum of points corresponding to a keyword related to target guidance information 51 (operation S199). The CPU 11 reads out an initial threshold from the operation history file 155 (operation S201). The CPU 11 adds the sum to the initial threshold to calculate a final threshold (operation S202). The CPU 11 stores the final threshold in the operation history file 155 and the threshold storage unit 156 (operation S203). The CPU 11 deletes a target record from the operation history file 155 (operation S204). The CPU 11 deletes guidance information 51, for which an operation has not been accepted within the given time period, from the display unit 14 (operation S205).

Next, a program termination process will be explained. The CPU 11 determines whether a program termination instruction has been accepted or not (operation S206). When determining that a program termination instruction has not been accepted (NO in operation S206), the CPU 11 returns the process again to the operation S191. On the other hand, when determining that a program termination instruction has been accepted from the input unit 13 (YES in operation S206), the CPU 11 reads out a point corresponding to the operation item "program termination" from the point table 157 (operation S207). The CPU 11 stores the date and time, the operation item and the point in each record in the operation history file 155 as illustrated in FIG. 15 (operation S208).

The CPU 11 calculates the sum of points, which are given with operations for the respective record in the operation history file 155 (operation S209). The CPU 11 respectively reads out an initial threshold of the respective record (operation S211). The CPU 11 respectively adds the sum of the respective record calculated in the operation S209 to the initial threshold of the respective record to calculate a final threshold for the respective record (operation S212). The CPU 11 stores the final threshold calculated for the respective record (operation S213). The CPU 11 stores the final threshold in the threshold storage unit 156 in accordance with a keyword of the respective record (operation S214).

The CPU 11 deletes all guidance information 51 displayed at the display unit 14 from the display unit 14 (operation S215). The CPU 11 deletes all record of the operation history file 155 (operation S216). Finally, the CPU 11 terminates a program related to the voice recognition software 151 and the control program 15P (operation S217). By including such a structure, the visibility at the display unit 14 can be enhanced by deleting guidance information 51, for which operation input has not been accepted from the input unit 13, after the elapse of a certain time period. Moreover, at the time of delete, a threshold for the next display of the guidance information 51 can be changed and the display mode may also be changed.

Since the present Embodiment 3 includes a structure described above and other structures are the same as those of Embodiments 1 and 2, like codes are used to refer to like parts and detailed explanation thereof is omitted.

Embodiment 4

Embodiment 4 relates to a mode for changing the display mode of guidance information 51 in real time during display at the display unit 14. FIG. 17 is an explanatory drawing illustrating the record layout of an operation history file 155 according to Embodiment 4. When accepting operation input for guidance information 51 from the input unit 13, the CPU 11 stores the date and time, the operation item and the point. In addition, the CPU 11 adds a point, which is stored in accordance with the operation item as above mentioned, to an initial threshold or an intermediate threshold related to the immediately preceding operation item. For example, at 11:20:35 on June 2 (description of the year is omitted), a point "+1" corresponding to an operation item "scroll" is added to the initial threshold "50." The value "51" obtained by addition is stored in the operation history file 155 as an intermediate threshold.

A point "+1" corresponding to an operation item "hyperlink" at 11:20:40 is then added to the intermediate threshold "51" related to the immediately preceding operation item. The value "52" obtained by addition is stored in the operation history file 155 as an intermediate threshold. The intermediate threshold is stored in the threshold storage unit 156 in Embodiment 4. The CPU 11 stores the intermediate threshold in the threshold storage unit 156 in accordance with a keyword or guidance information 51.

FIG. 18 is an explanatory drawing illustrating the record layout of a threshold storage unit 156 according to Embodiment 4. An intermediate threshold field is provided in addition to the record of Embodiment 1. Every time an intermediate threshold corresponding to an operation item is stored in the operation history file 155, the CPU 11 stores an intermediate threshold in the intermediate threshold field in the threshold storage unit 156. The CPU 11 compares an initial threshold in the threshold storage unit 156 with the intermediate threshold, and decides a display mode by the process described in Embodiment 1. In the example illustrated in FIG. 18 in which an evaluation value is 61 and an initial threshold is 50, the difference thereof is larger than or equal to 10 and the display mode of guidance information 51 becomes "large". Here, when an intermediate threshold increases and reaches "55" as illustrated in FIG. 18, the difference thereof becomes 6 and the display mode becomes "medium."

The CPU 11 refers to the display mode file 158 and displays guidance information 51 at the display unit 14 according to the decided display mode. When accepting input for the delete button 517 from the input unit 13, the CPU 11 adds a point corresponding to the operation item "delete" read out from the point table 157 to the immediately preceding intermediate threshold. The CPU 11 stores the value, which is obtained by addition, in the final threshold field in the operation history file 155 as a final threshold. The CPU 11 also stores the final threshold in the final threshold field in the threshold storage unit 156 in accordance with the guidance information 51. The CPU 11 then deletes the guidance information 51 from the display unit 14.

Figure 19A:
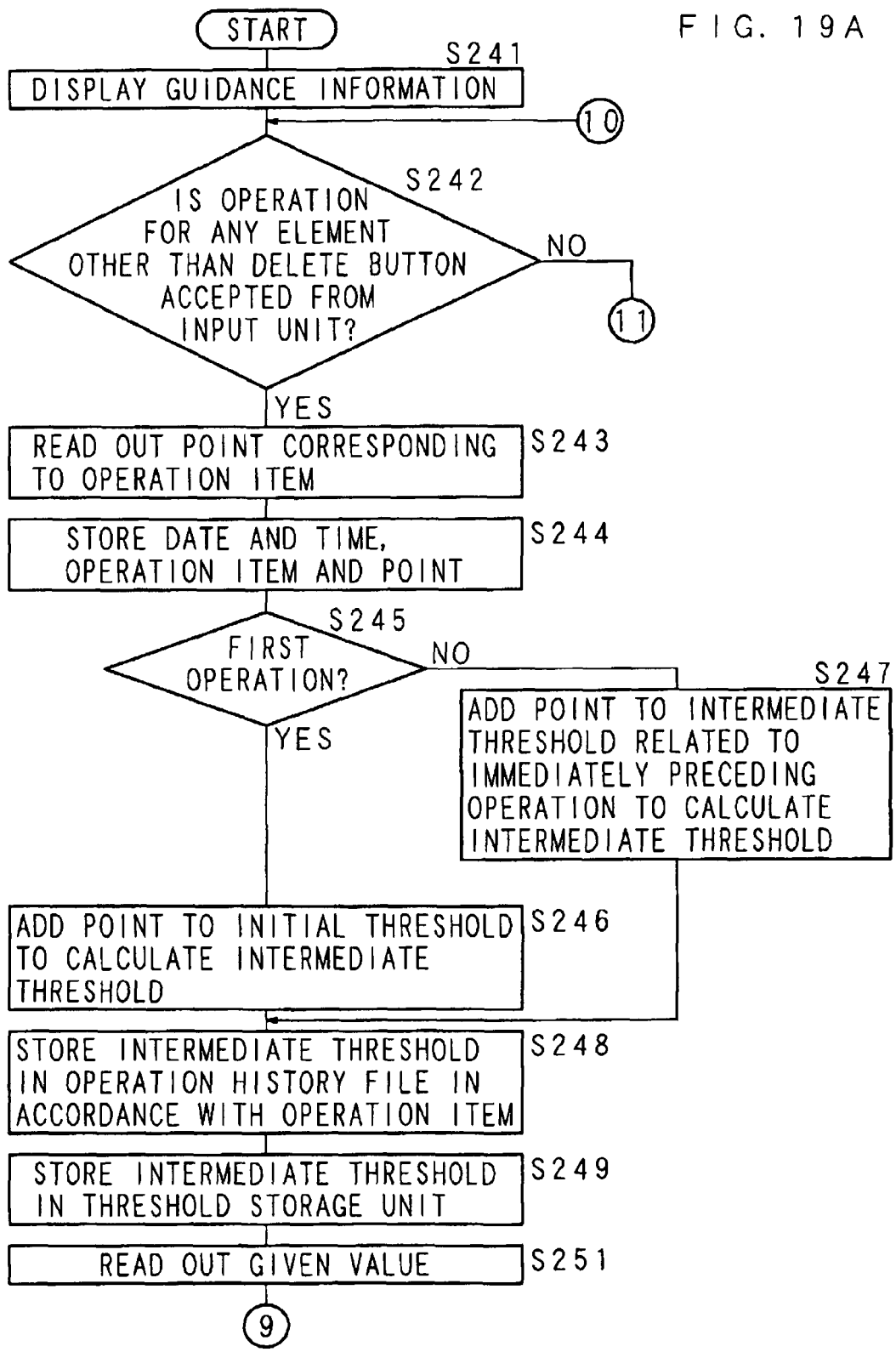
FIGS. 19A, 19B and 19C are operation charts illustrating the procedure of a display mode deciding process.
Figure 19B:
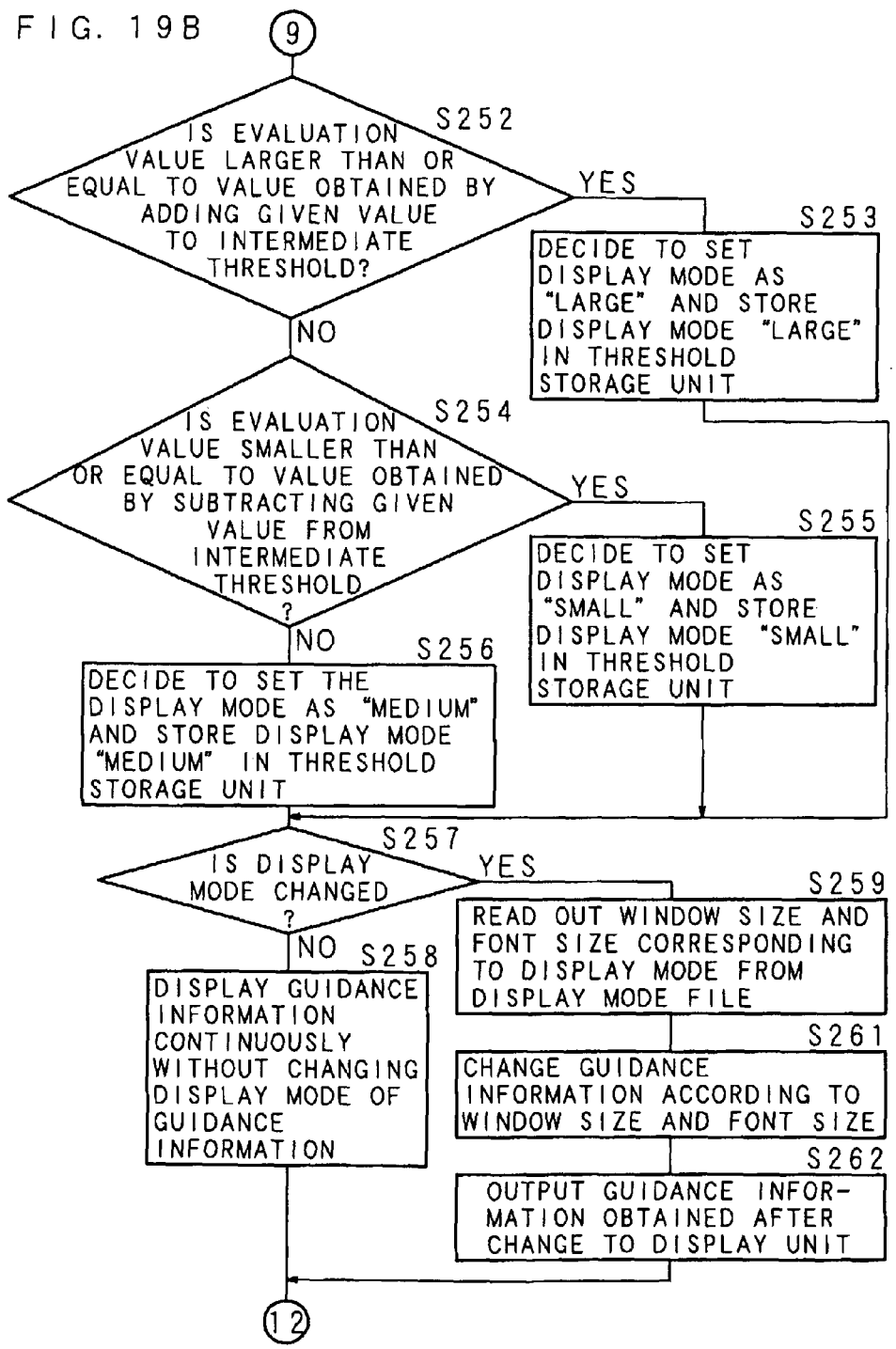
Figure 19C:
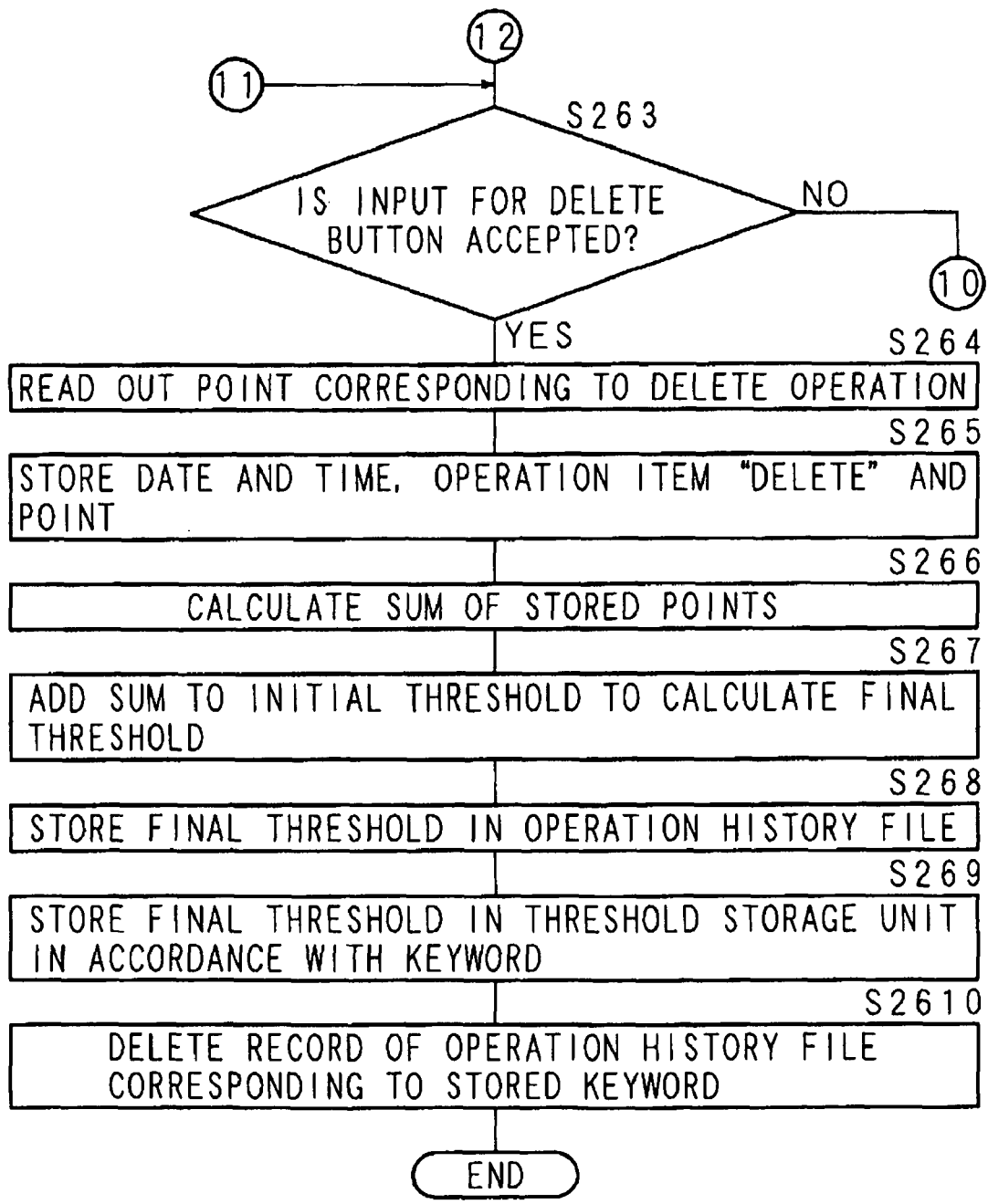

FIGS. 19A, 19B and 19C are operation charts illustrating the procedure of a display mode deciding process. The CPU 11 displays guidance information 51 at the display unit 14 by the process described in Embodiment 1 (operation S241). The CPU 11 determines whether an operation for any element other than the delete button 517 has been accepted for target guidance information 51 from the input unit 13 or not (operation S242). When determining that an operation for any element other than the delete button 517 has been accepted from the input unit 13 (YES in operation S242), the CPU 11 reads out a point corresponding to an operation item related to the accepted operation from the point table 157 (operation S243). The CPU 11 stores the date and time outputted from the clock unit 18, the operation item and the point in the operation history file 155 (operation S244).

The CPU 11 determines whether the operation accepted in the operation S242 is the first operation or not by referring to the operation history file 155 (operation S245). When determining that the accepted operation is the first operation (YES in operation S245), the CPU 11 adds the point read out in the operation S243 to an initial threshold stored in the operation history file 155 to calculate an intermediate threshold (operation S246). On the other hand, when determining that the accepted operation is not the first operation (NO in operation S245), the CPU 11 adds the point to an intermediate threshold related to the immediately preceding operation so as to perform accumulative addition to the intermediate threshold of the last time and calculates an intermediate threshold (operation S247).

The CPU 11 stores an intermediate threshold calculated in the operation S246 or S247 in the operation history file 155 in accordance with the operation item (operation S248). The CPU 11 stores the calculated intermediate threshold in the intermediate threshold field of the same guidance information 51 in the threshold storage unit 156, on the basis of guidance information 51 corresponding to an intermediate threshold stored in the operation history file 155 (operation S249). A process for determining whether change of the display mode is necessary or not will be performed hereinafter on the basis of the stored intermediate threshold.

The CPU 11 reads out a given value prestored in the storage unit 15 (operation S251). The CPU 11 determines whether an evaluation value is larger than or equal to a value obtained by adding the given value to an intermediate threshold or not (operation S252). When determining that the evaluation value is larger than or equal to the value obtained by addition (YES in operation S252), the CPU 11 decides to set the display mode as "large" and stores the display mode "large" in the threshold storage unit 156 (operation S253). When determining that the evaluation value is smaller than the value obtained by addition (NO in operation S252), the CPU 11 determines whether an evaluation value is smaller than or equal to a value obtained by subtracting the given value from an intermediate threshold or not (operation S254). When determining that the evaluation value is smaller than or equal to the value obtained by subtracting the given value (YES in operation S254), the CPU 11 decides to set the display mode as "small" and stores the display mode "small" in the threshold storage unit 156 (operation S255).

When determining that the evaluation value is larger than the value obtained by subtracting the given value (NO in operation S254), the CPU 11 decides to set the display mode as "medium" and stores the display mode "medium" in the threshold storage unit 156 (operation S256). The CPU 11 determines whether the display mode of guidance information 51 based on an initial threshold decided in the operation S118, S121 or S122 in Embodiment 1 has been changed or not (operation S257). When determining that the display mode has not been changed (NO in operation S257), the CPU 11 displays the aforementioned guidance information 51 continuously at the display unit 14 without changing the display mode of the guidance information 51 (operation S258).

When determining that the display mode has been changed (YES in operation S257), the CPU 11 reads out a window size and a font size corresponding to the display mode, which is decided in the operation S253, S255 or S256, from the display mode file 158 (operation S259). The CPU 11 changes the guidance information 51 according to the read-out window size and font size (operation S261). The CPU 11 outputs guidance information 51 obtained after the change to the display unit 14 (operation S262). When determining in the operation S242 that an operation for any element other than the delete button 517 has not been accepted from the input unit 13 (NO in operation S242), the CPU 11 determines whether input for the delete button 517 has been accepted or not (operation S263). The CPU 11 also performs the process in the operation S263 after the process in the operation S262 or S258. When determining that input for the delete button 517 has not been accepted from the input unit 13 (NO in operation S263), the CPU 11 proceeds to the operation S242 and repeats the above process. In such a manner, the display mode of guidance information 51 is changed sequentially on the basis of an intermediate threshold.

When determining that input for the delete button 517 has been accepted (YES in operation S263), the CPU 11 reads out a point corresponding to a delete operation from the point table 157 (operation S264). The CPU 11 stores the date and time outputted from the clock unit 18, the operation item "delete" and the read-out point in the operation history file 155 (operation S265). The CPU 11 calculates the sum of points corresponding to the respective operation items stored in the operation history file 155 (operation S266). The CPU 11 adds the sum to an initial threshold to calculate a final threshold (operation S267). The CPU 11 stores the final threshold in the operation history file 155 in accordance with a keyword (operation S268).

The CPU 11 also stores the final threshold in the threshold storage unit 156 in accordance with a keyword (operation S269). After the aforementioned process, the CPU 11 deletes the record of the operation history file 155, in which a final threshold is stored, corresponding to the keyword (operation S2610). The final threshold stored here is used as an initial threshold for the next display of the guidance information 51 and the display mode is changed by comparing the initial threshold with an evaluation value. By including such a structure, the display mode is changed in real time in conjunction with an operation for guidance information 51 displayed at the display unit 14 and it becomes possible to transmit information to the operator more effectively.

Since the present Embodiment 4 included a structure described above and other structures are substantially the same as those of Embodiments 1 to 3, like codes are used to refer to like parts and detailed explanation thereof is omitted.

Embodiment 5

Embodiment 5 relates to a mode for decreasing a threshold when guidance information 51 is not displayed at the display unit 14 for a given time frame. FIG. 20 is an explanatory drawing illustrating the record layout of a threshold storage unit 156 according to Embodiment 5. For displaying guidance information 51 newly at the display unit 14 for the same keyword, the CPU 11 stores the date and time, the evaluation value, the initial threshold and the display mode in the threshold storage unit 156 in accordance with a keyword and guidance information 51 as described in Embodiment 1. In the example illustrated in FIG. 20, guidance information 51 concerning a keyword "new product" is stored at 09:23:35 on June 2, and guidance information 51 concerning the same keyword "new product" is also stored 8 days later, on June 10.

In Embodiment 1, an initial threshold for a keyword "new product" on June 10 becomes "50," which is the same as a final threshold "50" of the record of the last time. In the present embodiment, when a given time frame has elapsed after the last display, the CPU 11 subtracts a given value prestored in the storage unit 15 and stores the value obtained by subtraction in the threshold storage unit 156 as an initial threshold. The description of the present embodiment explains an example wherein the given value is 5. In the example illustrated in FIG. 20, an initial threshold "45" is obtained by subtracting 5. A given value to be subtracted is not limited to this numerical value. For example, the given value may be increased as the time frame increases.

Figure 21A:
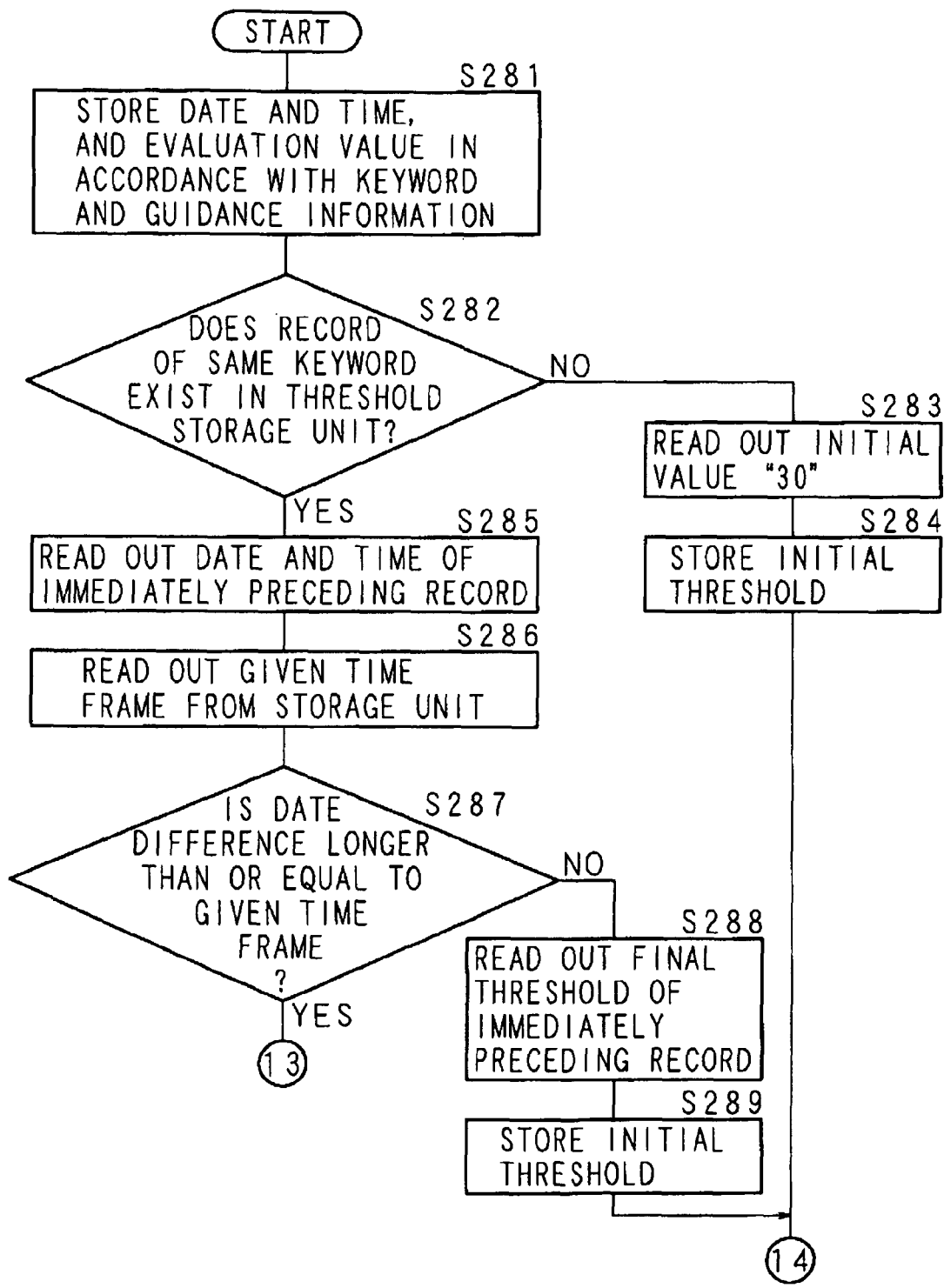

FIGS. 21A and 21B are operation charts illustrating the procedure of an initial threshold changing process. For displaying guidance information 51 in a given mode by the process described in Embodiment 1, the CPU 11 stores the date and time outputted from the clock unit 18 and the evaluation value in the threshold storage unit 156 in accordance with a keyword and guidance information 51 (operation S281). The following process is then performed in order to decide an initial threshold and a display mode. The CPU 11 determines whether record of substantially the same keyword exists in the threshold storage unit 156 or not (operation S282).

When determining that a record of substantially the same keyword does not exist (NO in operation S282), the CPU 11 reads out an initial value "30" prestored in the storage unit 15 (operation S283). The CPU 11 stores the read-out initial value in the threshold storage unit 156 as an initial threshold (operation S284). When determining that a record of substantially the same keyword exists in the threshold storage unit 156 (YES in operation S282), the CPU 11 reads out the date and time of the immediately preceding record related to the same keyword in the threshold storage unit 156 (operation S285). The CPU 11 reads out a given time frame (e.g., one week) prestored in the storage unit 15 (operation S286). The CPU 11 determines whether a date difference between the date and time stored in the operation S281 and the date and time read out in the operation S285 is longer than or equal to the given time frame read out in the operation S286 or not (operation S287).

When determining that the date difference is shorter than the given time frame (NO in operation S287), the CPU 11 reads out a final threshold of the immediately preceding record from the threshold storage unit 156 (operation S288) since it is highly possible that the operator has a certain memory. The CPU 11 stores the read-out final threshold in the threshold storage unit 156 as an initial threshold related to guidance information 51 to be displayed (operation S289). When determining that date difference is longer than or equal to the given time frame (YES in operation S287), the CPU 11 reads out a prestored given value (e.g., 5) from the storage unit 15 (operation S290) since it may be highly that the memory of the operator has gotten less clear. The CPU 11 subtracts the given value from a final threshold of the immediately preceding record to calculate an initial threshold (operation S291).

The CPU 11 stores the initial threshold in the threshold storage unit 156 as an initial threshold related to guidance information 51 to be displayed (operation S292). The CPU 11 decides the display mode by the process described in Embodiment 1, on the basis of an evaluation value and an initial threshold stored in the operation S292, S289 or S284 (operation S293). The CPU 11 outputs guidance information 51 to the display unit 14 on the basis of the decided display mode (operation S294). With such a structure, the possibility that guidance information 51 which has not been displayed for a long time frame is displayed large at the display unit 14 is increased. Accordingly, even when the memory of the operator gets less clear, the service efficiency can be enhanced by displaying the guidance information large.

Since the present Embodiment 5 includes a structure described above and other structures are substantially the same as those of Embodiments 1 to 4, like codes are used to refer to like parts and detailed explanation thereof is omitted.

Embodiment 6

FIG. 22 is a block diagram illustrating a personal computer 1 according to Embodiment 6. A program for causing a personal computer 1 according to Embodiments 1 to 5 to operate may be stored in the storage unit 15 by causing a record medium reading device (not illustrated) to read a record medium 1A such as a CD-ROM as in the present Embodiment 6. Moreover, the program as above mentioned may be downloaded from another computer (not illustrated) connected via the communication network N. The following description will explain the content thereof.

The personal computer 1 illustrated in FIG. 22 downloads a program, which causes acceptance of an evaluation value, display of guidance information 51, decision of a display mode and the like, by a record medium 1A or from another computer (not illustrated) via a communication unit 16. The aforementioned program is installed as a control program 15P of the storage unit 15 and loaded to the RAM 12 for execution. Such a structure realizes functioning as the above personal computer 1.

Since the present Embodiment 6 includes a structure described above and other structures are substantially the same as those of Embodiments 1 to 5, like codes are used to refer to like parts and detailed explanation thereof is omitted.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A guidance information display device comprising:
a voice input unit for inputting voice;
a display unit for displaying guidance information;
an operation unit for accepting operation;
a processor capable of executing the following processes of:
performing voice recognition based on inputted voice in the voice input unit;
calculating an evaluation value for a recognition result of voice recognition;
reading out guidance information from a storage unit, which stores the guidance information corresponding to the recognition result, and displaying the guidance information at the display unit;
deciding a display mode of the guidance information at the display unit based on a variable value, which varies with an operation from the operation unit for the displayed guidance information, and the calculated evaluation value:
changing the variable value for guidance information displayed at the display unit when an operation for said guidance information is accepted from the operation unit; and
reading out a given number of times from the storage unit;
counting the number of times that the calculated evaluation value of the recognition request is smaller than the variable value;
determining whether the counted number of times is larger than or equal to the given number of times;
increasing the variable value when the counted number of times is larger than or equal to the given number of times; and
storing the changed variable value in the storage unit in accordance with the guidance information.

2. The guidance information display device according to claim 1, wherein said process of changing the variable value changes the variable value when a delete operation for said guidance information displayed at the display unit is accepted from the operation unit.

3. The guidance information display device according to claim 1, the processor being capable of further executing the following processes of:
deleting guidance information displayed at the display unit when an operation for the guidance information is not accepted from the operation unit for a certain time period; and
changing the variable value corresponding to guidance information stored in the storage unit when the guidance information is deleted, wherein
the storage unit stores the changed variable value in accordance with the guidance information.

4. The guidance information display device according to claim 1, wherein
said process of deciding a display mode decides that guidance information related to a recognition result is displayed at the display unit to have a size larger than a reference size when a calculated evaluation value for the recognition result is larger than or equal to a value obtained by adding a given value to the variable value, and
the guidance information is displayed at the display unit to have a size smaller than the reference size when a calculated evaluation value is smaller than or equal to a value obtained by subtracting a given value from the variable value.

5. The guidance information display device according to claim 1, the processor being capable of further executing the following processes of:
a process of decreasing the variable value for guidance information stored in the storage unit after elapse of a given time frame after the guidance information is displayed at the display unit.

6. A guidance information display device comprising:
a voice input unit for inputting voice;
a display unit for displaying guidance information;
an operation unit for accepting operation; and a processor capable of executing the following processes of:
  performing voice recognition based on inputted voice in the voice input unit;
  calculating an evaluation value for a recognition result of voice recognition;
  reading out guidance information from a storage unit, which stores the guidance information corresponding to the recognition result, and displaying the guidance information at the display unit;
  deciding a display mode of the guidance information at the display unit based on a variable value, which varies with an operation from the operation unit for the displayed guidance information, and the calculated evaluation value;
  changing a variable value for guidance information displayed at the display unit when an operation for said guidance information is accepted from the operation unit;
  reading out a given number of times from the storage unit;
  counting the number of times that the calculated evaluation value of a recognition result is larger than the variable value
  determining whether the counted the number of times is larger than or equal to the given number of times,
  decreasing the variable value when the counted number of times is larger than or equal to the given number of times;
  counting the number of times that the calculated evaluation value of the recognition result is smaller than the variable value,
  determining whether the counted number of times is larger than or equal to the given number of times, and
  increasing the variable value when the counted number of times is larger than or equal to the given number of times.

7. A guidance information display device for displaying guidance information at a display unit, comprising:
  a voice input unit for inputting voice;
  a voice recognition processor for performing voice recognition based on inputted voice in the voice input unit;
  a calculator for calculating an evaluation value for a recognition result of voice recognition by the voice recognition processor;
  a display module for reading out guidance information from a storage unit, which stores the guidance information corresponding to the recognition result, and displaying the guidance information at the display unit; and
  a decision unit for deciding a display mode of the guidance information at the display unit based on a variable value, which varies with an operation from the operation unit for the guidance information displayed by the display module, and the evaluation value calculated by the calculator,
  a change unit for changing the variable value for guidance information displayed at the display unit when an operation for said guidance information is accepted from the operation unit;
  a reading unit for reading out a given number of times from the storage unit;
  a unit for counting the number of times that the calculated evaluation value of the recognition result is smaller than the variable value;
  a unit for determining whether the counted number of times is larger than or equal to the given number of times;
  a unit for increasing the variable value when the counted number of times is larger than or equal to the given number of times; and
  a unit for storing the variable value changed by the change unit in the storage unit in accordance with the guidance information.

8. The guidance information display device according to claim 7, wherein the change unit changes a variable value for guidance information displayed at the display unit when a delete operation for said guidance information is accepted from the operation unit.

9. The guidance information display device according to claim 7, wherein the change unit comprises:
  a unit for setting a first point when a scroll operation for guidance information displayed at the display unit is accepted from the operation unit;
  a unit for setting a second point when a delete operation for the guidance information is accepted from the operation unit; and
  a unit for adding the first point and the second point to the variable value for the guidance information.

10. The guidance information display device according to claim 7, further comprising:
  a delete unit for deleting guidance information displayed at the display unit when an operation for the guidance information is not accepted from the operation unit for a certain time period; and
  a unit for changing the variable value corresponding to guidance information stored in the storage unit when the guidance information is deleted by the delete unit, wherein
  the storage unit stores the variable value changed by said unit in accordance with the guidance information.

11. The guidance information display device according to claim 7, wherein the decision unit decides to display guidance information related to a recognition result at the display unit to have a size larger than a reference size when an evaluation value calculated by the calculator for the recognition result is larger than or equal to a value obtained by adding a given value to the variable value, and to display the guidance information at the display unit to have a size smaller than the reference size when an evaluation value calculated by the calculator is smaller than or equal to a value obtained by subtracting a given value from the variable value.

12. The guidance information display device according to claim 7, further comprising a unit for decreasing the variable value for guidance information stored in the storage unit after elapse of a given time frame after the display module displays the guidance information at the display unit.

13. A guidance information display device for displaying guidance information at a display unit, comprising:
  a voice input unit for inputting voice;
  a voice recognition processor for performing voice recognition based on inputted voice in the voice input unit;
  a calculator for calculating an evaluation value for a recognition result of voice recognition by the voice recognition processor;
  a display module for reading out guidance information from a storage unit, which stores the guidance information corresponding to the recognition result, and displaying the guidance information at the display unit;
  a decision unit for deciding a display mode of the guidance information at the display unit based on a variable value, which varies with an operation from the operation unit for the guidance information displayed by the display module, and the evaluation value calculated by the calculator;

a change unit for changing the variable value for guidance information displayed at the display unit when an operation for said guidance information is accepted from the operation unit;
a reading unit for reading out a given number of times from the storage unit;
a unit for counting the number of times that the calculated evaluation value of the recognition result is smaller than the variable value;
a unit for determining whether the counted number of times is larger than or equal to the given number of times;
a unit for increasing the variable value when the counted number of times said unit is larger than or equal to the given number of times; and
a unit for storing the variable value changed by the change unit in the storage unit in accordance with the guidance information; wherein
the decision unit reads out the variable value for guidance information displayed at the display unit from the storage unit and decides a display mode of the
guidance information at the display unit based on said variable value and the evaluation value calculated by the calculator.

14. A guidance information display device for displaying guidance information at a display unit, comprising:
a voice input unit for inputting voice;
a voice recognition processor for performing voice recognition based on inputted voice in the voice input unit;
a calculator for calculating an evaluation value for a recognition result of voice recognition by the voice recognition processor;
a display module for reading out guidance information from a storage unit, which stores the guidance information corresponding to the recognition result, and
displaying the guidance information at the display unit;
a decision unit for deciding a display mode of the guidance information at the display unit based on a variable value, which varies with an operation from the operation unit for the guidance information displayed by the display module, and the evaluation value calculated by the calculator;
a change unit for changing the variable value for guidance information displayed at the display unit when an operation for said guidance information is
accepted from the operation unit;
a reading unit for reading out a given number of times from the storage unit;
a unit for counting the number of times that the calculated evaluation value of a recognition result is larger than the variable value;
a determining unit for determining whether the counted number of times is larger than or equal to the given number of times;
a decreasing unit for decreasing the variable value when the counted number of times is larger than or equal to the given number of times; and
a unit for storing the variable value changed by the change unit in the storage unit in accordance with the guidance information, wherein the decision unit reads out the variable value for guidance information displayed at the display unit from the storage unit and decides a display mode of the guidance information at the display unit based on said variable value and the evaluation value calculated by the calculator.

15. A guidance information display method for displaying guidance information at a display unit of a guidance information display device, comprising:
performing voice recognition based on inputted voice in a voice input unit for inputting voice;
calculating an evaluation value for a recognition result of voice recognition;
reading out guidance information from a storage unit, which stores the guidance information corresponding to the recognition result, and displaying the guidance information at the display unit; and
deciding a display mode of the guidance information at the display unit based on a variable value, which varies with an operation from the operation unit for the displayed guidance information, and the calculated evaluation value,
changing the variable value for guidance information displayed at the display unit when an operation for said guidance information is accepted from the operation unit;
reading out a given number of times from the storage unit;
counting the number of times that the calculated evaluation value of the recognition result is smaller than the variable value;
determining whether the counted number of times is larger than or equal to the given number of times;
increasing the variable value when the counted number of times is larger than or equal to the given number of times; and
storing the variable value changed by the change unit in the storage unit in accordance with the guidance information.

16. A non-transitory computer-readable recording medium which stores therein a program for causing a computer to display guidance information at a display unit, said program comprising:
obtaining an evaluation value for a recognition result of voice recognition by a voice recognition processor from a calculator for calculating the evaluation value for the recognition result;
reading out guidance information from a storage unit, which stores the guidance information corresponding to the recognition result, and displaying the guidance information at the display unit; and
deciding a display mode of the guidance information at the display unit based on a variable value, which varies with an operation from the operation unit for the displayed guidance information, and the obtained evaluation value,
changing the variable value for guidance information displayed at the display unit when an operation for said guidance information is accepted from the operation unit;
reading out a given number of times from the storage unit;
counting the number of times that the calculated evaluation value of the recognition result is smaller than the variable value;
determining whether the counted number of times is larger than or equal to the given number of times;
increasing the variable value when the counted number of times is larger than or equal to the given number of times; and
storing the variable value changed by the change unit in the storage unit in accordance with the guidance information.

17. A guidance information display device comprising:
a voice input unit for inputting voice;
a display unit for displaying guidance information;
an operation unit for accepting operation; and
a processor capable of executing the following processes of:
performing voice recognition based on inputted voice in the voice input unit;
calculating an evaluation value for a recognition result of voice recognition;
reading out guidance information from a storage unit, which stores the guidance information corresponding to the recognition result, and displaying the guidance information at the display unit;
deciding a display mode of the guidance information at the display unit based on a variable value, which varies with an operation from the operation unit for the displayed guidance information, and the calculated evaluation value:
changing the variable value for guidance information displayed at the display unit when an operation for said guidance information is accepted from the operation unit;
reading out a given number of times from the storage unit;
counting the number of times that the calculated evaluation value of a recognition result is larger than the variable value,
determining whether the counted number of times is larger than or equal to the given number of times,
decreasing the variable value when the counted number of times is larger than or equal to the given number of times;
storing the changed variable value in the storage unit in accordance with the guidance information.

18. A guidance information display device for displaying guidance information at a display unit, comprising:
a voice input unit for inputting voice;
a voice recognition processor for performing voice recognition based on inputted voice in the voice input unit;
a calculator for calculating an evaluation value for a recognition result of voice recognition by the voice recognition processor;
a display module for reading out guidance information from a storage unit, which stores the guidance information corresponding to the recognition result, and displaying the guidance information at the display unit;
a decision unit for deciding a display mode of the guidance information at the display unit based on a variable value, which varies with an operation from the operation unit for the guidance information displayed by the display module, and the evaluation value calculated by the calculator;
a change unit for changing the variable value for guidance information displayed at the display unit when an operation for said guidance information is accepted from the operation unit;
a reading unit for reading out a given number of times from the storage unit;
a unit for counting the number of times that the calculated evaluation value of a recognition result is larger than the variable value;
a determining unit for determining whether the counted number of times is larger than or equal to the given number of times;
a decreasing unit for decreasing the variable value when the counted number of times is larger than or equal to the given number of times; and
a unit for storing the variable value changed by the change unit in the storage unit in accordance with the guidance information.

19. A guidance information display method for displaying guidance information at a display unit of a guidance information display device, comprising:
performing voice recognition based on inputted voice in a voice input unit for inputting voice;
calculating an evaluation value for a recognition result of voice recognition;
reading out guidance information from a storage unit, which stores the guidance information corresponding to the recognition result, and displaying the guidance information at the display unit;
deciding a display mode of the guidance information at the display unit based on a variable value, which varies with an operation from the operation unit for the displayed guidance information, and the calculated evaluation value;
changing the variable value for guidance information displayed at the display unit when an operation for said guidance information is accepted from the operation unit;
reading out a given number of times from the storage unit;
counting the number of times that the calculated evaluation value of a recognition result is larger than the variable value;
determining whether the counted number of times is larger than or equal to the given number of times;
decreasing the variable value when the counted number of times is larger than or equal to the given number of times; and
storing the variable value changed by the change unit in the storage unit in accordance with the guidance information.

20. A non-transitory computer-readable recording medium which stores therein a program for causing a computer to display guidance information at a display unit, said program comprising:
obtaining an evaluation value for a recognition result of voice recognition by a voice recognition processor from a calculator for calculating the evaluation value for the recognition result;
reading out guidance information from a storage unit, which stores the guidance information corresponding to the recognition result, and displaying the guidance information at the display unit;
deciding a display mode of the guidance information at the display unit based on a variable value, which varies with an operation from the operation unit for the displayed guidance information, and the obtained evaluation value;
changing the variable value for guidance information displayed at the display unit when an operation for said guidance information is accepted from the operation unit;
reading out a given number of times from the storage unit;
counting the number of times that the calculated evaluation value of a recognition result is larger than the variable value;

determining whether the counted number of times is larger than or equal to the given number of times;

decreasing the variable value when the counted number of times is larger than or equal to the given number of times; and storing the variable value changed by the change unit in the storage unit in accordance with the guidance information.

* * * * *

UNITED STATES PATENT AND TRADEMARK OFFICE
CERTIFICATE OF CORRECTION

PATENT NO. : 8,407,047 B2
APPLICATION NO. : 12/385158
DATED : March 26, 2013
INVENTOR(S) : Kenji Abe Page 1 of 1

It is certified that error appears in the above-identified patent and that said Letters Patent is hereby corrected as shown below:

In the Claims:

Column 25, Line 26, In Claim 6, after "counted" delete "the".
Column 27, Line 15 (Approx.), In Claim 13, after "times" delete "said unit".

Signed and Sealed this
Third Day of September, 2013

Teresa Stanek Rea
*Acting Director of the United States Patent and Trademark Office*